(12) United States Patent
Romagnoli et al.

(10) Patent No.: US 6,867,902 B2
(45) Date of Patent: Mar. 15, 2005

(54) PARAMETRIC DEVICE FOR WAVELENGTH CONVERSION

(75) Inventors: Marco Romagnoli, Milan (IT); Luciano Socci, Milan (IT); Raffaele Corsini, Milan (IT); Michele Midrio, Padua (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 106 days.

(21) Appl. No.: 10/135,772

(22) Filed: May 1, 2002

(65) Prior Publication Data

US 2003/0039023 A1 Feb. 27, 2003

Related U.S. Application Data

(60) Provisional application No. 60/287,414, filed on May 1, 2001.

(30) Foreign Application Priority Data

May 1, 2001 (EP) .............................................. 01201557

(51) Int. Cl.[7] .............................. G02F 1/35; G02F 1/39
(52) U.S. Cl. ......................... 359/326; 359/332; 385/122
(58) Field of Search ................................ 359/326–332; 385/122

(56) References Cited

U.S. PATENT DOCUMENTS

| | | | | |
|---|---|---|---|---|
| 5,175,739 A | * | 12/1992 | Takeuchi et al. | 372/45 |
| 5,241,413 A | * | 8/1993 | Uenishi et al. | 359/328 |
| 5,243,676 A | * | 9/1993 | Bierlein et al. | 359/326 |

(List continued on next page.)

FOREIGN PATENT DOCUMENTS

| | | | | |
|---|---|---|---|---|
| EP | 358229 A2 | * | 3/1990 | G02F/1/015 |
| WO | WO 99/52015 | | 10/1999 | |

OTHER PUBLICATIONS

Lam et al.; "A Tunable Wavelength Demultiplexer Using Logarithmic Filter Chains"; Journal of Lightwave Technology, vol. 16, No. 9, pp. 1657–1662, (1998).

Centini et al.; "Dispersive Properties of Finite, One–Dimensional Photonic Band Gap Structures: Applications to Nonlinear Quadratic Interactions"; The American Physical Society, Physical Review E, vol. 60, No. 4, pp. 4891–4898, (1999).

Centini et al.; "Efficient Nonlinear Infrared Parametric Generation in One–Dimensional Photonic Band Gap Structures"; Optics Communications vol. 189, pp. 135–142, (2001).

(List continued on next page.)

Primary Examiner—John D. Lee
(74) Attorney, Agent, or Firm—Finnegan, Henderson, Farabow, Garrett & Dunner, L.L.P.

(57) ABSTRACT

Device for performing a parametric process, comprising a substantially periodic photonic crystal structure comprising a plurality of unitary cells each comprising a first layer having a first refractive index n1 and a first length L1, a second layer having a second refractive index n2, with n1 different from n2, and a second length L2, a third layer having a third refractive index n3, with n3 different from n2, and a third length L3 and a fourth layer having a fourth refractive index n4, with n4 different from n1 and from n3, and a fourth length L4, wherein at least one among the first, the second, the third and the fourth layers has a non-linearity of the $\chi_2$ or $\chi_3$ type;

at least one of the following conditions is met:
      a) n1 is different from n3;
      b) n2 is different from n4;
      c) L1 is different from L3;
      d) L2 is different from L4; and n1, n2, n3, n4, L1, L2, L3, L4 have such values as to perform the parametric process in phase matching conditions.

22 Claims, 10 Drawing Sheets

U.S. PATENT DOCUMENTS

| | | | |
|---|---|---|---|
| 5,426,717 A | | 6/1995 | Bindloss et al. |
| 5,682,401 A | | 10/1997 | Joannopoulos et al. |
| 5,751,466 A | * | 5/1998 | Dowling et al. ............ 385/122 |
| 5,815,307 A | * | 9/1998 | Arbore et al. ............... 359/328 |
| 5,907,427 A | * | 5/1999 | Scalora et al. ............... 359/331 |
| 6,002,522 A | | 12/1999 | Todori et al. |
| 6,016,214 A | * | 1/2000 | Meyer et al. ................ 359/330 |
| 6,304,366 B1 | * | 10/2001 | Scalora et al. ............... 359/328 |
| 6,396,617 B1 | * | 5/2002 | Scalora ....................... 359/331 |
| 6,538,794 B1 | * | 3/2003 | D'Aguanno et al. ........ 359/279 |
| 2001/0028029 A1 | * | 10/2001 | Scalora et al. ............... 250/216 |
| 2002/0135853 A1 | * | 9/2002 | Scalora ....................... 359/248 |

OTHER PUBLICATIONS

"Optical Electronics"; Holt, Reinhart and Winston by Amnon Yarin, Third Edition, pp. 227–236, (1985).

Yoo et al.; "Wavelength Conversion by Difference Frequency Generation in AlGaAs Waveguides with Periodic Domain Inversion Achieved by Wafer Bonding"; Appl. Phys. Lett, vol. 68, No. 19, pp. 2609–2611, (1996).

Chou et al.; "1.5–$\mu$m–Band Wavelength Conversion Based on Difference–Frequency Generation in $LiNbO_3$ Waveguides with Integrated Coupling Structures"; Optics Letters vol. 23, No. 13, pp. 1004–1006, (1998).

Chou et al.; "Multiple–Channel Wavelength Conversion by Use of Engineered Quasi–Phase–Matching Structures in $LiNbO_3$ Waveguides"; Optics Letters, vol. 24, No. 16, pp. 1157–1159, (1999).

Kiehne et al.; "A Numerical Study of Optical Second–Harmonic Generation in a One–Dimensional Photonic Structure", Applied Physics Letters, vol. 75, No. 12, pp. 1676–1678, (1999).

Scalora et al.; "Pulsed Second–Harmonic Generation in Nonlinear, One–Dimensional, Periodic Structures"; The American Physical Society, Physical Review A, vol. 56, No. 4, pp. 3166–3174, (1997).

Horie et al.; "Reliability Improvement of 980–nm Laser Diodes with a New Facet Passivation Process"; IEEE Journal of Selected Topics in Quantum Electronics, vol. 5, No. 3, pp. 832–838, (1999).

Yee; "Numerical Solution of Initial Boundary Value Problems Involving Maxwell's Equations in Isotropic Media", IEEE Transactions on antennas and propagation, vol. AP–14, No. 3, pp. 302–307, (1966).

Yoo; "Wavelength Conversion Technologies for WDM Network Applications"; Journal of Lightwave Technology, vol. 14, No. 6, pp. 955–966, (1996).

Coleman; "Metalorganic Chemical Vapor Deposition for Optoelectronic Devices"; Proceedings of the IEEE, vol. 85, No. 11, pp., 1715–1729, (1997).

Morris; "Single–Mode Distributed–Feedback 761–nm GaAs–AlGaAs Quantum–Well Laser"; IEEE Photonics Technology Letters, vol. 7, No. 5, pp. 455–457, (1995).

Kobayashi; "Single Frequency and Turnable Laser Diodes"; Journal of Lightwave Technology, vol. 6, No. 11, pp. 1623–1633, (1988).

Sarlet, et al.; "Control of Widely Tunable SSG–DBR Lasers for Dense Wavelength Division Multiplexing"; Journal of Lightwave Technology, vol. 18, No. 8, pp. 1128–1138, (2000).

Chou et al.; "Efficient Wide–Band and Tunable Midspan Spectral Inverter Using Cascaded Nonlinearities in $LiNbO_3$ Waveguides"; IEEE Photonics Technology Letters, vol. 12, No. 1, pp. 82–84, (2000).

* cited by examiner

US 6,867,902 B2

PARAMETRIC DEVICE FOR WAVELENGTH CONVERSION

CROSS REFERENCE TO RELATED APPLICATIONS

This application claims the benefit of U.S. Provisional Application No. 60/287,414, filed May 1, 2001, the content of which is incorporated herein by reference, and claims the right to priority based on European Patent Application No. 01201557.4, filed May 1, 2001.

BACKGROUND OF THE INVENTION

1. Field of the Invention

The present invention relates to a device for performing a parametric process comprising a photonic crystal periodic structure.

The present invention relates, moreover, to an optical communication line and an optical communication system comprising such device.

2. Description of the Related Art

A parametric process is a typical process of materials having a non-linearity of the $\chi_2$ or $\chi_3$ type according to which electromagnetic radiations at predetermined frequencies that propagate in such materials interact with each other for generating electromagnetic radiations at different frequencies from those that have generated them (Amnon Yariv, "Optical Electronics", Third Edition, 1985, HOLT, REINEHART and WINSTON, pages 227–236).

For example, a parametric process is a process according to which a pump radiation at frequency $\omega_p$ that propagates in a non-linear material, interacting with a signal radiation at frequency $\omega_s$, generates a radiation at frequency $\omega_g$.

Typical parametric processes are a difference frequency generation process, according to which $\omega_g=\omega_p-\omega_s$, a sum frequency generation process, according to which $\omega_g=\omega_p+\omega_s$, a second or third harmonic generation process, according to which $\omega_g=2\omega_p$ or, respectively, $\omega_g=3\omega_p$ and the known Four Wave Mixing (FWM) process.

For a parametric process to be efficient, a condition known as phase matching must be met.

However, the phase matching condition is difficult to obtain in materials having non-linearity of the $\omega_2$ or $\omega_3$ type since such materials are typically dispersive, that is, they have a refractive index variable with the frequency $\omega$.

Methods for achieving the phase matching condition have already been proposed.

S. J. B. Yoo et al. ("*Wavelength conversion by difference frequency generation in AlGaAs waveguides with periodic domain inversion achieved by wafer bonding*", Appl. Phys. Letters, Vol. 68, No. 19, May 1996, pages 2609–2611), M. H. Chou et al. ("1.5-$\mu$m-band wavelength conversion based on difference-frequency generation in LiNbO$_3$ waveguides with integrated coupling structures", Optics Letters, Vol. 23, No. 13, July 1998, pages 1004–1006) e M. H. Chou et al. ("*Multiple-channel wavelength conversion by use of engineered quasi-phase-matching structures in LiNbO$_3$ waveguides*", Optics Letters, Vol. 24, No. 16, August 1999, pages 1157–1159) describe the use of methods known under the name of "periodic domain inversion" or "poling" that essentially consist in periodically inverting the sign of the non-linearity of a non-linear material (for example, LiNbO$_3$ and AlGaAs) so as to obtain a parametric process of difference frequency generation in condition of quasi-phase-matching.

Recently, moreover, the use of one-dimensional photonic crystal periodic structures (also called photonic band-gap structures) has been proposed for carrying out a second harmonic generation parametric process in phase matching conditions.

A one-dimensional photonic crystal structure typically consists of a periodical alternance of two layers of material having different refractive index. The multiple reflections at the interfaces between the two layers at different refractive index generate constructive and destructive interferences between the transmitted light and the reflected light, and make the photonic crystal structure allow the propagation of electromagnetic waves in some intervals of frequencies (or wavelengths) and forbid it in other intervals.

In the present description and claims, the expression
"photonic band gap" or "band gap" is used for indicating a range of frequencies (or wavelengths) that are not transmitted by the photonic crystal structure;
"transmission band" is used for indicating a range of frequencies (or wavelengths) that are transmitted by the photonic crystal structure;
"band gap or transmission band of n-th order" is used for indicating the nth band gap or the nth transmission band as the frequencies increase;
"band edge" is used for indicating the edge of a transmission band;
"nth order low frequency band edge" is used for indicating the edge at the lowest frequency of the transmission band of nth order;
"nth order high frequency band edge" is used for indicating the edge with the highest frequency of the transmission band of nth order.

G. T. Kiehne et al., ("A numerical study of optical second-harmonic generation in a one-dimensional photonic structure"), Applied Physics Letters, Vol. 75, No. 12, 20 September 1999, pages 1676–1678, present a band-gap engineering approach for obtaining a finite photonic-band-edge-resonant stratified periodic dielectric structure in the presence of material dispersion. When the structure contains second-order nonlinear optical materials, enhanced phase matched optical second harmonic generation may be obtained. The proposed structure consists of four sublayers per period, denoted by (ABCD)$^N$, where N is the number of periods, but only two materials since the dielectric constants are fixed according to the conditions $n_{AC}=n_1$ and $n_{B,D}=n_2$. The thickness of each layer is defined according to given linear functions of a same parameter $\alpha$. For the (ABCD)$^N$ structure with sufficiently small material dispersion, it is possible to choose $\alpha$ such that doubly resonant second harmonic generation can be obtained. The double-resonance condition is defined to be when both the fundamental frequency and the second harmonic frequency coincide with stop-band edge resonances. The approach is applied to a finite GaAs/AlAs periodic stack. For a fundamental frequency wave of vacuum wavelength of 3.10 $\mu$m, a second harmonic wave of wavelength 1.55 $\mu$m will be generated in the structure. The approach is not material specific and may be applied as long as the material dispersion is not too large.

M. Scalora et al. ("*Pulsed second-harmonic generation in non linear, one dimensional, periodic structures*", Physical Review, Vol. 56, No. 4, October 1997, pages 3166–3174) present a numerical study of second harmonic generation (SH) in a one-dimensional photonic crystal material, doped with a non-linear medium $\chi_2$, consisting of 40 dielectric layers (20 periods in all) wherein the refractive index of the layers alternates between $n_2=1,42857$ and $n_1=1$. Moreover, for a reference wavelength $\lambda_0$, the layers with the two refractive indices $n_1$ and $n_2$ have a thickness $a=\lambda_0/4n_1$ and $b=\lambda_0/2n_2$, respectively. This choice of parameters allows achieving a mixed half-quarter-wave stack for wavelength $\lambda_0$ and makes the structure have a band gap of the second order removed from the band gap of the first order by approximately a factor 2. This allows realising a second harmonic generation parametric process in which the frequency $\omega_0$ of the pump radiation is at the low frequency band edge of the first order and the frequency $\omega_g=2\omega_0$ of the generated radiation is close to the low frequency band edge of the second order. The Authors state that the positioning of the frequencies of the pump radiation and of the generated second harmonic one in the proximity of a band edge allows obtaining a more efficient process since near a band edge a strong overlap between the propagation modes of the pump and of the generated radiation and a co-propagation of the modes occur and the interaction times are larger ("enhancement" phenomenon).

WO 99/52015 describes a second harmonic generator based on a periodic photonic crystal structure. The described structure comprises a plurality of layers of a first and a second material that periodically alternate, and has a band edge at the pump radiation frequency and a second transmission resonance near the band edge of the second order band gap at the generated second harmonic frequency.

M. Centini et al. ("*Dispersive properties of finite, one dimensional photonic band gap structures: applications to non linear quadratic interactions*", Physical Review E, Vol. 60, No. 4, October 1999, pages. 4891–4898) discuss the linear dispersive properties of one-dimensional photonic crystal structures consisting of the periodical alternance of two layers with different refractive index and the conditions necessary for optimal second harmonic generation process.

The Applicant notes that one-dimensional photonic crystal structures consisting of the periodical alternance of two layers with different refractive index described by the above documents for realising a second harmonic generation process are not suitable for realising more complex parametric processes (such as, for example, the difference frequency generation process) in phase matching condition.

The Applicant has thus faced the technical problem of providing a device comprising a photonic crystal structure capable of performing a difference frequency generation parametric process in phase matching conditions.

In general, the Applicant faced the technical problem of providing a device comprising a photonic crystal structure that allows performing a parametric process according to which a pump radiation at frequency $\omega_p$ generates a radiation at frequency $\omega_g$ by interacting with at least one signal radiation at frequency $\omega_s$ (with $\omega_s$ equal to or different from, $\omega_p$) in phase matching conditions.

More in general the Applicant faced the technical problem of providing a photonic crystal periodic structure which is suitable to be adapted to perform the above mentioned parametric process.

SUMMARY OF THE INVENTION

In a first aspect thereof, thus, the present invention relates to a substantially periodic photonic crystal structure comprising a plurality of unitary cells that follow one other along a predetermined direction, each unitary cell comprising:

a first layer having a first refractive index n1 and a first length L1;

a second layer having a second refractive index n2, with n1 different from n2, and a second length L2;

wherein:

each unitary cell also comprises a third layer having a third refractive index n3, with n3 substantially equal to n1, and a third length L3 and a fourth layer having a fourth refractive index n4, with n4 substantially equal to n2, and a fourth length L4, the periodical alternance of the first, second, third and fourth layer forming said substantially periodic photonic crystal structure;

at least one among the first, the second, the third and the fourth layers has a non-linearity of the $\chi_2$ or $\chi_3$ type;

the difference between the refractive indices n1, n3 and n2, n4 is equal to at least 0.2;

at least one of the following conditions is met:

a) L1 is different from L3;

b) L2 is different from L4.

The Applicant has verified that the substantially periodic photonic crystal structure according to the invention, made of the periodical alternance of four layers, having refractive index n1, n2, n3 and n4 and lengths L1, L2, L3 and L4 and of which at least one has a non-linearity of the $\chi_2$ or $\chi_3$ type, advantageously has the necessary flexibility to be engineered for realising in phase matching conditions, a parametric process wherein a pump radiation at frequency $\omega_p$ generates a radiation at frequency $\omega_g$ interacting with at least one signal radiation at frequency $\omega_s$.

As regards the structural and functional features of the substantially periodic structure, of the unitary cells, and of the first, second, third and fourth layer, reference shall be made to what described below for the device according to a second aspect of the invention.

In a second aspect thereof, the present invention relates to a device for performing a parametric process according to which a pump radiation at frequency $\omega_p$ generates a radiation at frequency $\omega_g$ interacting with at least one signal radiation at frequency $\omega_s$ comprising a substantially periodic photonic crystal structure comprising a plurality of unitary cells that follow one other along a predetermined direction, each unitary cell comprising a first layer having a first refractive index n1 and a first length L1, a second layer having a second refractive index n2, with n1 different from n2, and a second length L2, an input for sending said at least one signal radiation at frequency $\omega_s$ along said substantially periodic structure;

an input for providing said pump radiation at frequency $\omega_p$ to said substantially periodic structure;

an output suitable to extract from the device said generated radiation at frequency $\omega_g$;

characterised in that each unitary cell also comprises a third layer having a third refractive index n3, with n3 different from n2, and a third length L3 and a fourth layer having a fourth refractive index n4, with n4 different from n1 and from n3, and a fourth length L4, the periodical alternance of the first, second, third and fourth layer forming said substantially periodic photonic crystal structure;

at least one among the first, the second, the third and the fourth layers has a non-linearity of the $\chi_2$ or $\chi_3$ type;

at least one of the following conditions is met:

a) n1 is different from n3;

b) n2 is different from n4;

c) L1 is different from L3;

d) L2 is different from L4; and in that n1, n2, n3, n4, L1, L2, L3, L4 are selected so as to realise the parametric process in phase matching conditions.

In the present description and claims, n1, n2, n3, n4 indicate the values of the refractive indices of the first, second, third and respectively, fourth layer at the wavelengths (or frequencies) of interest (that is, at the wavelengths of the radiations involved in the parametric process). Moreover, conditions a)–b) are deemed to be satisfied when they are met at at least one wavelength of interest (for example, at at least one of the frequencies $\omega_p$, $\omega_s$ e $\omega_g$).

The device of the invention having a substantially periodic photonic crystal structure made of the periodical alternance of four layers, having refractive indices n1, n2, n3 and n4 and lengths L1, L2, L3 and L4 and of which at least one has a linearity of the $\chi_2$ or $\chi_3$ type, advantageously allows performing in phase matching conditions a difference frequency generation process and, in general, a parametric process in which a pump radiation at frequency $\omega_p$ generates a radiation at frequency $\omega_g$ interacting with at least one signal radiation at frequency $\omega_s$.

For example, n1, n2, n3, n4, L1, L2, L3, L4 can be selected so as to carry out a difference frequency generation process according to which $\omega_g=\omega_p-\omega_s$, a sum frequency generation process according to which $\omega_g=\omega_p+\omega_s$, a second or third harmonic generation process according to which $\omega_g=2\omega_p$ or, respectively, $\omega_g=3\omega_p$ or a Four Wave Mixing (FWM) process.

In fact, the Applicant has verified that the device having the above features has the necessary flexibility to carry out different types of parametric processes in phase matching conditions.

Moreover, the Applicant notes that the device of the invention having the above substantially periodic photonic crystal structure made of the alternance of four layers has the necessary flexibility to carry out a parametric process in phase matching conditions and according to the application required for the device.

This in an advantageous aspect of the invention since the phase matching condition of each type of parametric process requires, as it will be illustrated in detail hereinafter, a substantially periodic structure having a predetermined transmission spectrum with precise features according to the type of application.

Further features and advantages of the device of the invention are indicated in the dependent claims.

Typically, the above substantially periodic structure is of the one-dimensional photonic crystal type.

In the present invention and claims, the expression

"substantially periodic structure" is used to indicate a structure that can comprise a plurality of substantially equal cells, or equal except for an apodisation;

"apodisation" is used to indicate a modulation, having a much higher period than the length of a cell, of one of the characteristic parameters of the layers of the cell, such as for example, the refractive index and the length;

"substantially equal cells" is used to indicate cells wherein corresponding layers are equal to one another (for example, in terms of refractive index n1–n4 and lengths L1–L4) except for production tolerances.

For example, the level of precision currently obtainable for the production of the layers of the cells is of about 10 nm.

Moreover, production tolerances are preferably such as not to appreciably affect the transmission spectrum of the photonic crystal structure.

In a variant, unitary cells are substantially equal.

In another variant, corresponding layers of the plurality of unitary cells differ from one another for example according to a modulation, having a much higher period than the length of the cells, of one of the parameters of the layers such as, for example, the refractive index and/or the length (apodisation).

This last variant is advantageous since it allows making the peaks of the transmission spectrum of the substantially periodic photonic crystal structure less deep (that is, it allows to partially flatten the transmission spectrum thereof and to smooth the oscillations thereof), thus improving the tolerances of positioning of frequencies $\omega_p$, $\omega_s$ e $\omega_g$ at such transmission peaks.

Apodisation can, for example, be of the Gaussian or raised cosine type.

Advantageously the first, the second, the third and the fourth layer are made of transparent materials at the working wavelengths (or frequencies) of the device.

For example, the working wavelengths are selected within the interval comprised between 0.1 $\mu$m and 3.5 $\mu$m. According to a variant, they are selected within the interval comprised between 0.5 $\mu$m and 3 $\mu$m. According to another variant, they are selected within the interval comprised between 0.5 $\mu$m and 2 $\mu$m.

Typically, the first and the third layer consist of the same material; that is, the first refractive index n1 is substantially equal to the third refractive index n3.

Moreover, the second and the fourth layer typically consist of the same material; that is, the second refractive index n2 is substantially equal to the fourth refractive index n4.

Advantageously, the difference between the refractive indices n1, n3 and n2, n4 is relatively high. Preferably, it is equal to at least 0.2; more preferably, to at least 0.4.

In fact, it has been verified that a relatively high difference between the refractive indices between adjacent layers allows increasing the enhancement phenomenon according to which the efficiency of a parametric process in a photonic crystal structure increases when the pump and/or signal radiation are at a band edge.

In a variant, the first, the second, the third and the fourth layer of the unitary cells are stacked on one another in a multilayer stack.

For example, the various layers are obtained on one another for epitaxial growth.

According to another variant, the first, the second, the third and the fourth layer of the unitary cells are side by side to one another.

For example, they are side by side to one another along an optical fibre so as to form an optical fibre grating.

Preferably, they are side by side to one another in a planar element.

In this case, the first and the third layer advantageously consist of the same material and the second and fourth layer advantageously consist of a gaseous element.

This is an advantageous embodiment of the invention since it allows realising a substantially periodic structure by simply performing cuts having predetermined depth and length (L2 and L4) and suitably spaced from one another (by L1 and L3) in a planar element consisting of a single structure having refractive index n1 and non-linearity of the $\chi_2$ or $\chi_3$ type.

Moreover, it has been verified that a substantially periodic structure with four (or more) layers allows performing cuts of moderate lengths (L2 and L4) (in the range of one or some hundreds nm) that are easy to realise and, at the same time, introduce relatively low scattering loss.

Advantageously, the gaseous element is a gas that allows obtaining a high difference between the refractive indices n1, n3 and n2, n4.

For example, such gaseous element consists of air that, having a refractive index equal to about 1, allows obtaining a high difference between the refractive indices n1, n3 and n2, n4.

According to a variant, the second and the fourth layer are maintained in vacuum conditions.

Preferably, the planar element is a planar optical waveguide.

In this way, the device of the invention is compatible (that is, easily connectable) with optical fibres and optical devices realised in optical fibre or planar waveguide and it is suitable to be inserted in optical communication systems or optical networks.

In this case, the first and the third layer of the unitary cells consist of waveguide portions having length L1 and L3 and n1 is the effective refractive index of the waveguide at the wavelengths of interest.

The waveguide typically comprises a substrate, a first cladding region, a core, a second cladding region and a ridge.

Advantageously, the substrate, the first and the second cladding region, the core and optionally, the ridge of the waveguide are realised with materials having a non-linearity of the $\chi_2$ or $\chi_3$ type.

Typical examples of materials having a non-linearity of the $\chi_2$ or $\chi_3$ type are $Al_x(GaAs)_{1-x}$, $LiNbO_3$ and silicon (for example, doped with germanium).

Advantageously, the waveguide is suitable to guarantee a single-mode propagation at the frequencies of the radiations involved in the parametric process (for example, both at a pump frequency $\omega_p$ and at a signal frequency $\omega_s$).

In an embodiment, each unitary cell of the substantially periodic photonic crystal structure comprises more than four layers. For example, each unitary cell comprises 6 or 8 layers with refractive indices n1–n6 or n1–n8 and lengths L1–L6 or L1–L8 suitably selected according to the invention.

According to an embodiment of the device of the invention, in a parametric process in which a pump radiation at frequency $\omega_p=2\omega$ interacts with a signal radiation at frequency $\omega_s$, with $\omega_s=\omega+\Delta\omega$, for generating a radiation at frequency $\omega_g$, with $\omega_g=\omega_p-\omega_s=\omega-\Delta\omega$, n1, n2, n3, n4, L1, L2, L3, L4 are selected so that the photonic crystal structure has a band gap of order $M_{2\omega}$ in the proximity of frequency $2\omega$ and a band gap of order $M_{107}$ in the proximity of frequency $\omega$ so that the following relation is satisfied: $M_{2\omega}2M_{107}+1$, where $M_{2\omega}$ and $M_{107}$ are two integers; and a transmission band with a $j_\omega$-th transmission peak at frequency $\omega$ so that the following relation is satisfied: $j_\omega=(N\pm1)/2$, where $j_\omega$ is an integer comprised between 1 and N−1 and N is the number of unitary cells;

the number N of unitary cells is an odd number; and the number N of unitary cells is selected so that two adjacent transmission peaks in a transmission band of the photonic crystal structure have a spacing in frequency that is substantially equal to $\Delta\omega$.

The Applicant has verified that these conditions are such that the above parametric process is performed in phase matching conditions, the frequency $\omega_p$ of the pump radiation is at a band edge, and the frequencies $\omega$, $\omega_s$ e $\omega_g$ are at a transmission peak within a transmission band of the photonic crystal structure.

The device according to this embodiment advantageously allows, as it will be better described in detail hereinafter, realising in phase matching conditions a spectral inversion operation with tunable signal radiation frequency $\omega_s$.

According to an alternative embodiment of the device, in a parametric process wherein a pump radiation at frequency $\omega_p=2\omega$ interacts with a signal radiation at frequency $\omega_s$, with $\omega_s=\omega+\Delta\omega$, for generating a signal radiation at frequency $\omega_g$, with $\omega_g=\omega_p-\omega_s=\omega-\Delta\omega$, p1 n1, n2, n3, n4, L1, L2, L3, L4 are selected so that the photonic crystal structure has a band gap of order $M_{2\omega}$ in the proximity of the frequency $2\omega$ and a band gap of order $M_\omega$ in the proximity of the frequency $\omega$ so that the following relation is satisfied: $M_{2\omega}=2M_\omega$, where $M_{2\omega}$ and $M_\omega$ are two integers; and a transmission band with a $j_\omega$-th transmission peak at frequency $\omega$ and a transmission band with a $j_{2\omega}$-th transmission peak at frequency $2\omega$ so that the following relation is satisfied: $j_{2\omega}=2j_\omega$, where j is an integer comprised between 1 and N−1 and N is the number of unitary cells, and the number N of unitary cells is selected so that the two adjacent transmission peaks in a transmission band of the photonic crystal structure have a spacing in frequency that is substantially equal to $\Delta\omega$.

The Applicant has verified that these conditions are such that the above parametric process is performed in phase matching conditions and the frequencies $\omega_p$, $\omega$, $\omega_s$ e $\omega_g$ are at a transmission peak within a transmission band of the photonic crystal structure.

The device according to this alternative embodiment advantageously allows, as it will be better described in detail hereinafter, realising, in phase matching conditions, a frequency converter device with tunable frequencies $\omega_p$ and $\omega_s$ of pump and signal radiations.

Advantageously, the device comprises a pump source suitable to provide the pump radiation at frequency $\omega_p$ to the substantially periodic photonic crystal structure. Moreover, the device typically further comprises means for optically coupling the pump source to the substantially periodic structure.

Preferably, the pump source is tunable.

Typically, the pump source is a laser source of the DFB (Distributed Feedback Bragg grating) or DBR (Distributed Bragg Reflector) type.

When the substantially periodic photonic crystal structure is realised in a waveguide, the pump source and the waveguide are advantageously integrated in the same substrate.

Typically, the output means of the device of the invention comprises an optical filter connected to the substantially periodic structure, suitable to let the radiation generated at frequency $\omega_g$ exit from the device and to suppress a possible residual pump radiation at frequency $\omega_p$ and a possible residual signal radiation at frequency $\omega_s$.

Advantageously, the input for sending the signal radiation at frequency $\omega_s$, the input for providing the pump radiation at frequency $\omega_p$, the output and the substantially periodic structure are arranged in the device with respect to one another so that the radiations involved in the parametric process, by propagating from the inputs towards the output, pass through the substantially periodic structure along the alternance of the layers (that is, so that the layers are stacked or side by side along the direction of propagation of the radiations from the input to the output of the device).

In a third aspect thereof, the present invention relates to an optical communication line comprising an optical transmission fibre length for transmitting at least one signal radiation at frequency $\omega_s$ and a device, connected to said optical fibre length, for performing a parametric process according to which a pump radiation at frequency $\omega_p$ generates a radiation at frequency $\omega_g$ interacting with said at least one signal radiation at frequency $\omega_s$, said device comprising a substantially periodic photonic crystal structure comprising a plurality of unitary cells that follow one other along a predetermined direction, each unitary cell comprising a first layer having a first refractive index n1 and a first length L1, and a second layer having a second refractive index n2, with n1 different from n2, and a second length L2, an input for sending said at least one signal radiation at frequency $\omega_s$ along said substantially periodic structure;

an input for providing said pump radiation at frequency $\omega_p$ to said substantially periodic structure;

an output suitable to extract from the device said generated radiation at frequency $\omega_g$;

characterised in that each unitary cell also comprises a third layer having a third refractive index n3, with n3 different from n2, and a third length L3 and a fourth layer having a fourth refractive index n4, with n4 different from n1 and from n3, and a fourth length L4, the periodical alternance of the first, second, third and fourth layer forming said substantially periodic photonic crystal structure;

at least one among the first, the second, the third and the fourth layers has a non-linearity of the $\chi_2$ or $\chi_3$ type;

at least one of the following conditions is met:
  a) n1 is different from n3;
  b) n2 is different from n4;
  c) L1 is different from L3;
  d) L2 is different from L4; and in that n1, n2, n3, n4, L1, L2, L3, L4 are selected so as to perform the parametric process in phase matching conditions.

As regards the structural and functional features of the device, reference shall be made to what described above.

In a fourth aspect thereof, the present invention relates to an optical communication system comprising a transmitting station for providing at least one signal radiation at a frequency $\omega_s$;

an optical communication line, connected to said transmitting station, for transmitting said signal radiation;

a receiving station connected to said optical communication line;

a device connected to said optical communication line for performing a parametric process according to which a pump radiation at frequency $\omega_p$ generates a radiation at frequency $\omega_g$ interacting with said at least one signal radiation at frequency $\omega_s$, said device comprising a substantially periodic photonic crystal structure comprising a plurality of unitary cells that follow one other along a predetermined direction, each unitary cell comprising a first layer having a first refractive index n1 and a first length L1, a second layer having a second refractive index n2, with n1 different from n2, and a second length L2, an input for receiving said at least one signal radiation at frequency $\omega_s$ and send it along said substantially periodic structure;

an input for providing said pump radiation at frequency $\omega_p$ to said substantially periodic structure;

an output suitable to extract from the device said radiation generated at frequency $\omega_g$;

characterised in that each unitary cell also comprises a third layer having a third refractive index n3, with n3 different from n2, and a third length L3 and a fourth layer having a fourth refractive index n4, with n4 different from n1 and from n3, and a fourth length L4, the periodical alternance of the first, second, third and fourth layer forming said substantially periodic photonic crystal structure;

at least one among the first, the second, the third and the fourth layers has a non-linearity of the $\chi_2$ or $\chi_3$ type;

at least one of the following conditions is met:
  a) n1 is different from n3;
  b) n2 is different from n4;
  c) L1 is different from L3;
  d) L2 is different from L4; and in that n1, n2, n3, n4, L1, L2, L3, L4 are selected so as to perform the parametric process in phase matching conditions.

Advantageously, the transmitting station is suitable to provide n optical signals having frequencies $\omega_{s1}, \omega_2 \ldots \omega_{sn}$ differing from one another, to multiplex them in wavelength in a single WDM optical signal and to send said WDM optical signal along the optical communication line.

Moreover, the receiving station is advantageously suitable to demultiplex a WDM optical signal coming from the optical communication line and to provide the demultiplexed signals to optional further processing stages.

As regards the structural and functional features of the device, reference shall be made to what described above.

In a fifth aspect thereof, the present invention relates to a method for generating, through a parametric process, a radiation at frequency $\omega_g$ through the interaction of a pump radiation at frequency $\omega_p$ with at least one signal radiation at frequency $\omega_s$, comprising the steps of:

a) supplying the radiations at frequencies $\omega_s$ and $\omega_p$ in a substantially periodic photonic crystal structure comprising a plurality of unitary cells that follow one other along a predetermined direction, each unitary cell comprising a first layer having a first refractive index n1 and a first length L1, a second layer having a second refractive index n2, with n1 different from n2, and a second length L2, and b) supplying the radiation at frequency $\omega_g$, generated in said structure, to an output;

characterised in that each unitary cell also comprises a third layer having a third refractive index n3, with n3 different from n2, and a third length L3 and a fourth layer having a fourth refractive index n4, with n4 different from n1 and from n3, and a fourth length L4, the periodical alternance of the first, second, third and fourth layer forming said substantially periodic photonic crystal structure;

at least one among the first, the second, the third and the fourth layers has a non-linearity of the $\chi_2$ or $\chi_3$ type;

at least one of the following conditions is met:
  a) n1 is different from n3;
  b) n2 is different from n4;
  c) L1 is different from L3;
  d) L2 is different from L4; and in that n1, n2, n3, n4, L1, L2, L3, L4 have such values as to perform the parametric process in phase matching conditions.

As regards the structural and functional features of the substantially periodical, reference shall be made to what described above.

BRIEF DESCRIPTION OF THE DRAWINGS

Further features and advantages of the present invention will appear more clearly from the following detailed description of a preferred embodiment, made with reference to the attached drawings. In such drawings.

DETAILED DESCRIPTION OF THE INVENTION

Figure 1:
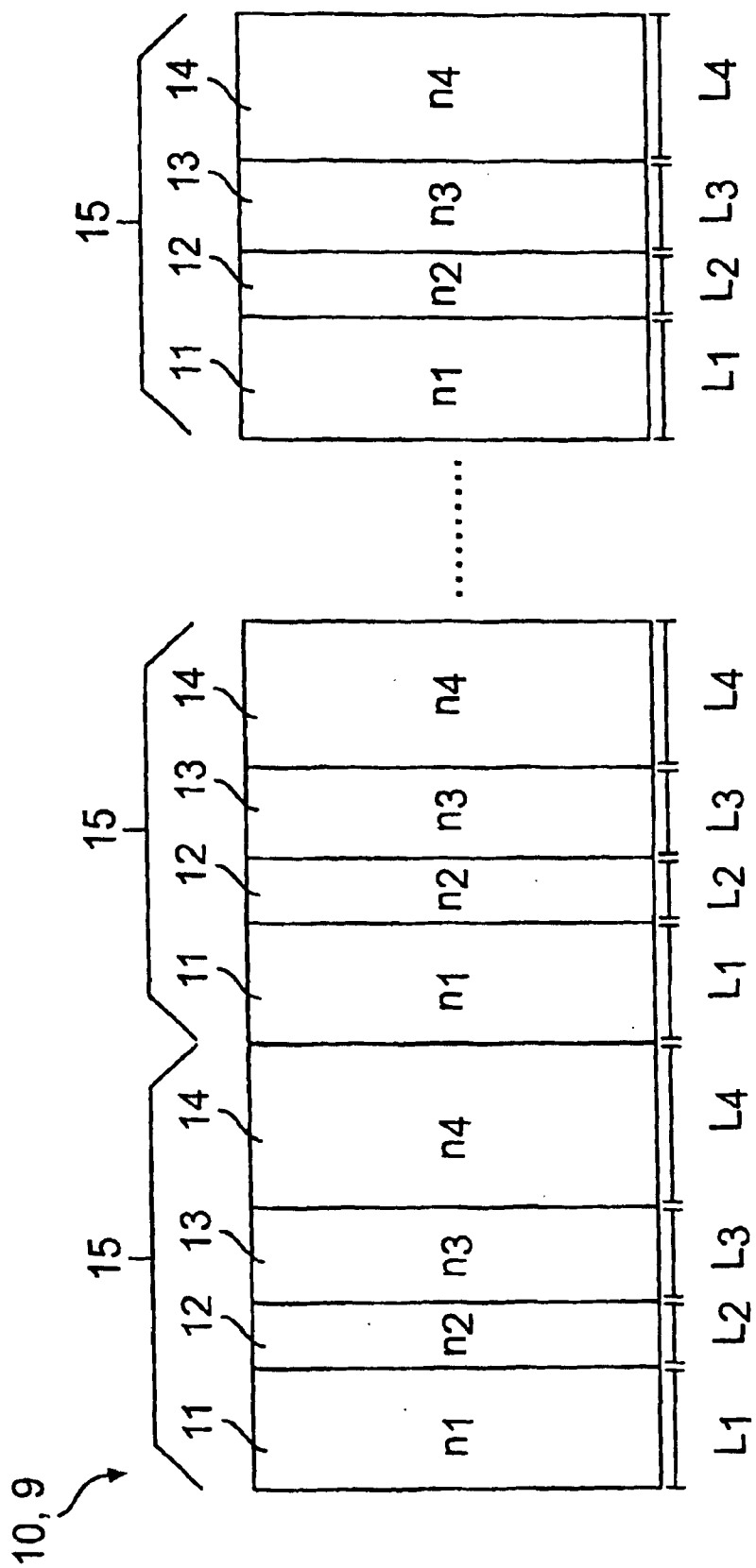
FIG. 1 shows a schematic view of a one-dimensional photonic crystal periodic structure of a device according to the invention.

FIG. 1 shows a schematic view of a one-dimensional photonic crystal structure 9 of a device 10 according to the invention, comprising N substantially equal unitary cells 15.

Each unitary cell 15 comprises, in turn, four layers 11–14 having refractive index n1, n2, n3, n4 and lengths L1, L2, L3, L4 that periodically alternate along the photonic crystal periodic structure 9.

At least one of the four layers 11–14 consists of a material having a non-linearity of the $\chi_2$ or $\chi_3$ type so as to be able to carry out a parametric process.

The values of the refractive indices n1–n4 and of lengths L1–L4 are selected, as it will be better described in detail hereinafter, so as to perform the parametric process in phase matching conditions and according to the desired application for the device 10.

The values of the refractive indices n1–n4 and of lengths L1–L4, in fact, determine the amplitude and the position in frequency (or wavelength) of the transmission bands and of the band gaps of the transmission spectrum of the device 10.

Figure 8:
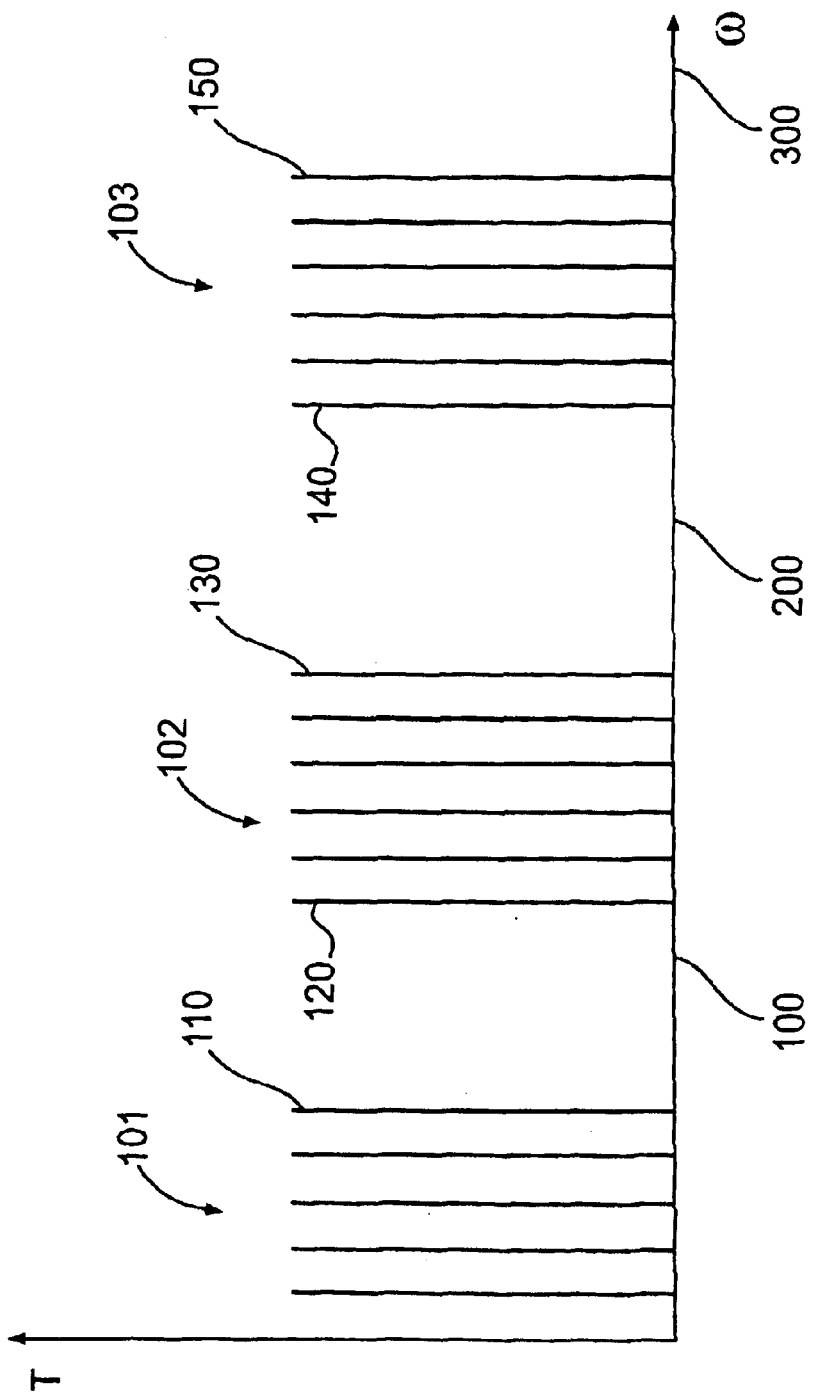
FIG. 8 shows a schematic view of a typical transmission spectrum of a device according to the invention.

FIG. 8 shows a schematic view of a typical transmission spectrum of the device 10 of the invention in function of frequency $\omega$.

In FIG. 8, reference number 101, 102, 103 respectively indicate the transmission band of the first, second and third order; reference number 100, 200, 300 respectively indicate the band gap of first, second and third order; reference number 110 and 120 indicate the band edge at high frequency of the first order and, respectively, at low frequency of the second order; reference number 130 and 140 indicate the band edge at high frequency of the second order and respectively, at low frequency of the third order; and finally, reference numeral 150 indicates the band edge at high frequency of the third order.

As it can be noted, the transmission bands 101, 102 of the first and second order are in the proximity of the band gap 100 of first order, the transmission bands 102, 103 of the second and third order are in the proximity of the band gap 200 of second order, and so on.

Moreover, the transmission bands 101, 102, 103 consist of a plurality of transmission peaks having a predetermined spacing in frequency. In the example shown in FIG. 8, each transmission band 101, 102, 103 has six transmission peaks. It has been verified that in a photonic crystal structure the number of transmission peaks of each transmission band 101–103 and the spacing in frequency between the transmission peaks depend on the number N of unitary cells 15 forming the structure. More in particular, the number of transmission peaks of each transmission band 101–103 is equal to N−1 independently of the number of layers forming the unitary cell 15 and the spacing in frequency between the peaks decreases as the number N of unitary cells 15 increases.

Figure 2:
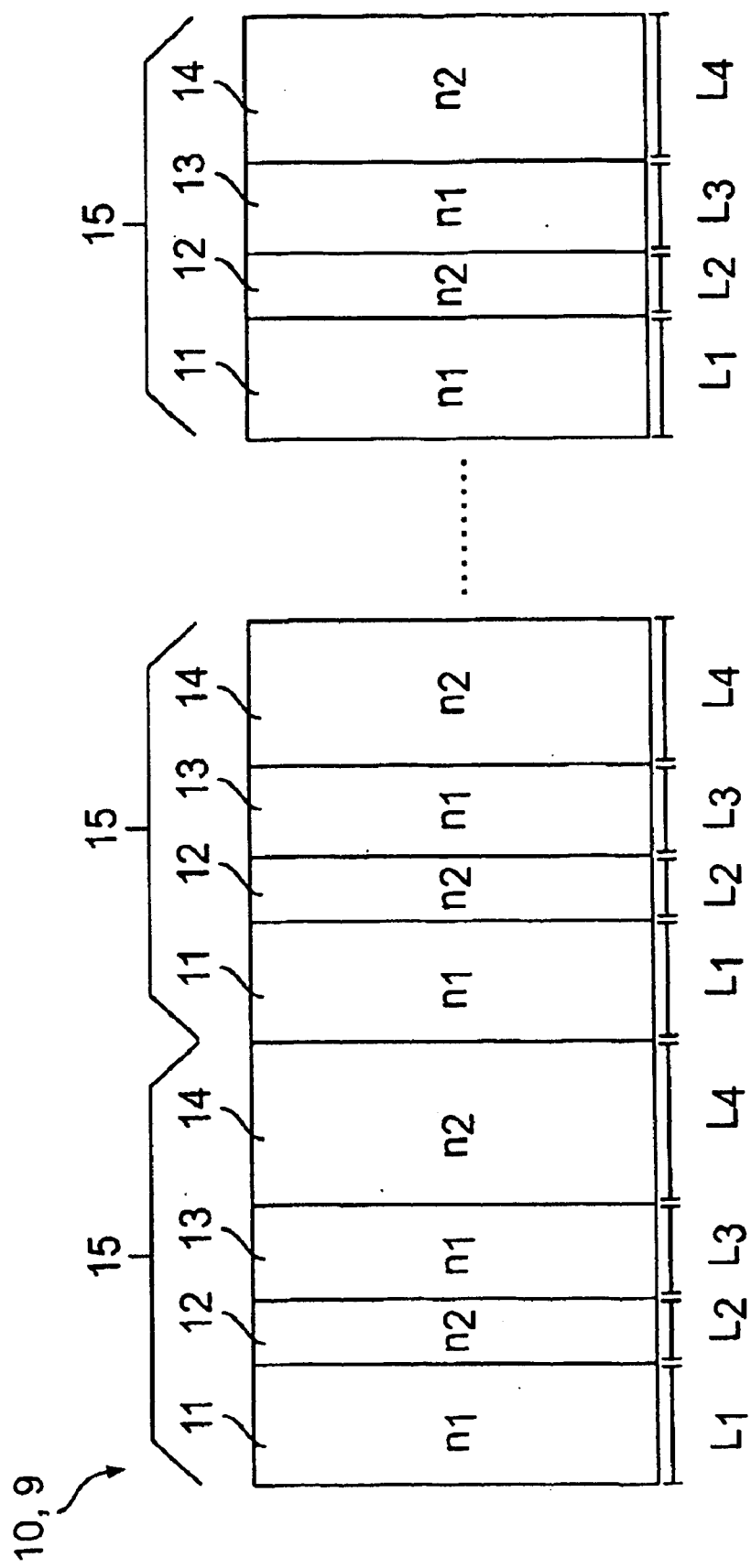
FIG. 2 shows a schematic view of an embodiment of the periodic structure of FIG. 1.

FIG. 2 shows an embodiment of the device 10 of FIG. 1 wherein the first and the third layer 11 and 13 consist of the same material and substantially have the same refractive index n1 and the second and fourth layer 12 and 14 consist of the same material and substantially have the same refractive index n2.

Moreover, in the device according to the embodiment of FIG. 2 L1 is different from L3 and/or L2 is different from L4.

The device 10 according to this embodiment is preferably made in a planar element wherein layers 11–14 are side by side to one another.

Moreover, the planar element advantageously consists of a single material having refractive index n1 and a non-linearity of the $\chi_2$ or $\chi_3$ type and it comprises cuts of predetermined depths and lengths (L2 and L4) suitably spaced from one another (by L1 and L3) so that the second and the fourth layer 12 and 14 consist of air (with refractive index equal to about 1) and the first and the third layer consist of the above material with refractive index n1.

Thus, in such device 10, the four-layer unitary cells 15 are advantageously obtained by simply performing suitable cuts in the planar element.

Figure 3:
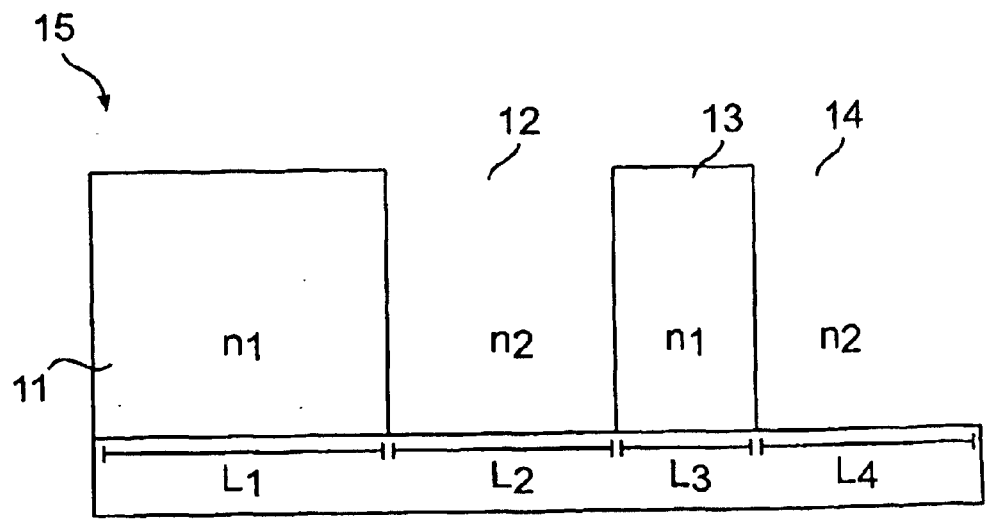
FIG. 3 show the section of a unitary cell of an example of periodic structure according to the embodiment of FIG. 2.

For example, FIG. 3 shows the section of a unitary cell 15 of such device 10 wherein the first and the third layer 11 and 13 have refractive index n1 and lengths L1 and L3 and the second and fourth layer 12 and 14 consist of air and have lengths L2 and L4.

The cuts are typically performed through a first lithography step to define the portions where the cuts are to be made, and a second etching step with which the cuts are performed.

For example, the lithography step is performed by means of an equipment by the company LEICA CAMBRIDGE, model EBMF 10,5 cs/120 System whereas the etching step is carried out by means of an equipment by the company OXFORD INSTRUMENTS PLASMA TECHNOLOGY, model Plasmalab System 100.

Moreover, the second etching step is preferably followed by a third passivation step performed according to known methods, for example as described for lasers by H. Horie et al. ("*Reliability Improvement of 980-nm laser diodes with a new facet passivation process*", IEEE Journal of Selected Topics in Quantum Electronics, Vol. 5, No. 3, May/June 1999, pages 832–838).

Figure 4:
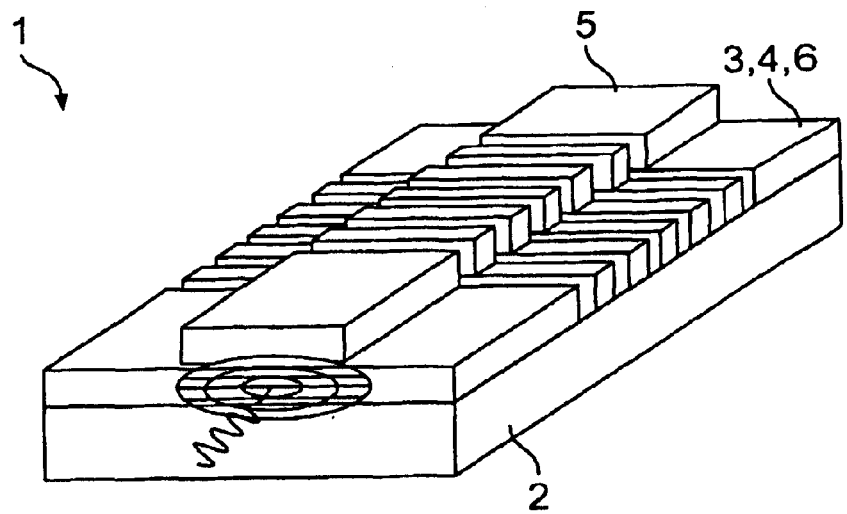
FIG. 4 shows a periodic structure according to the embodiment of FIG. 2 realised in a planar optical waveguide.

FIG. 4 shows a preferred embodiment of the device of FIG. 2, wherein the planar element consists of a planar optical waveguide 1.

Figure 5:
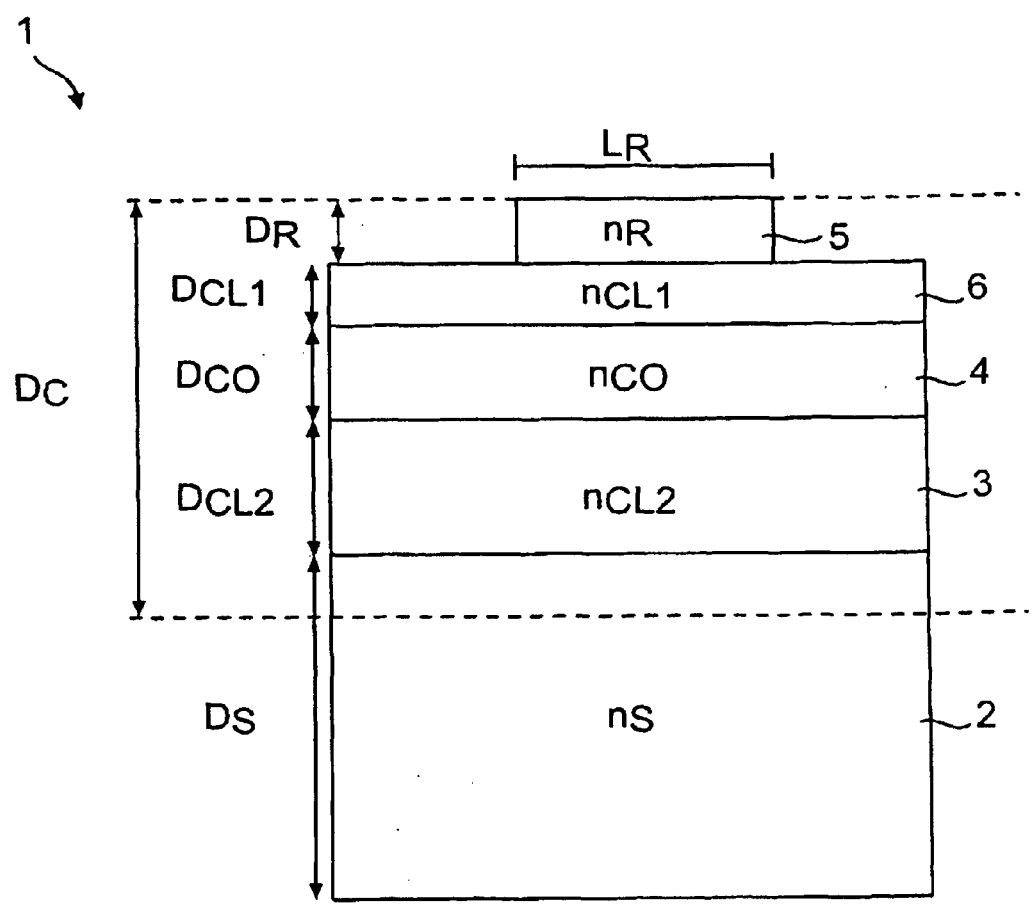
FIG. 5 shows a cross section of a waveguide according to FIG. 4.

The waveguide 1 is of the conventional type, and it comprises a ridge 5, a first cladding region 6, a core 4, a second cladding region 3 and a substrate 2 (FIG. 5). Preferably, the cuts performed in the waveguide 1 for the purpose of forming the second and fourth layer 12 and 14 of the unitary cells 15 have such depth $D_c$ as to allow the radiation propagation modes propagating in the waveguide to propagate wholly, or partly, in the cuts, thus reducing losses.

Typically, the cuts have such depth as to incise the waveguide 1 up to the second cladding region 3. Preferably, as shown in FIG. 5, they have such depth Dc as to incise at least partly also substrate 2.

In this preferred embodiment of the device 10, the refractive index n1 of the first and third layer 11 and 13 is the effective refractive index of the waveguide 1 whereas the refractive index n2 of the second and fourth layer 12 and 14 is the refractive index of air (equal to about 1).

Advantageously, thicknesses $D_s$, $D_{c12}$, $D_{co}$, $D_{c11}$, $D_r$ and the refractive indices $n_s$, $n_{c12}$, $n_{co}$, $n_{c11}$, $n_r$ respectively of substrate 2, of the second cladding region 3, of the core 4, of the first cladding region 6 and of the ridge 5 are selected so as to guarantee a single-mode propagation at the frequencies (or wavelengths) of the electromagnetic radiations involved in the parametric process.

For example, the waveguide 1 consists of $Al_x(GaAs)_{1-x}$ that has a non-linearity of the $\chi_2$ type.

In a particular case, in the waveguide 1 the quantity of aluminium (Al) is of about 50% in the substrate 2; about 30% in the second cladding region 3; about 20% in the core 4 and about 25% in the first cladding region 6 and in the ridge 5.

With such compositions, substrate 2, the second cladding region 3, the core 4, the first cladding region 6 and the ridge 5 have refractive indices $n_s$, $n_{c12}$, $n_{co}$, $n_{c11}$, $n_r$—at the wavelengths, for example, of 1550 nm and 775 nm—shown in table 1.

TABLE 1

|  | @ 1550 nm | @ 775 nm |
|---|---|---|
| $n_s$ | 3.176 | 3.326 |
| $n_{c12}$ | 3.282 | 3.498 |
| $n_{co}$ | 3.334 | 3.536 |
| $n_{c11}$ | 3.308 | 3.517 |
| $n_r$ | 3.308 | 3.517 |

The effective refractive index of the waveguide 1 having the refractive indices of table 1 is equal to about 3.45 at 775 nm and about 3.17 at 1550 nm.

Moreover, thickness $D_s$, $D_{c12}$, $D_{co}$, $D_{c11}$ $D_r$ of the waveguide 1 is, for example, as follows $D_s$ equal to about 3 µm;
$D_{c12}$ equal to about 0.14 µm;
$D_{co}$ equal to about 0.14 µm;
$D_{c11}$ equal to about 0.10 µm;
$D_r$ equal to about 0.14 µm.

Moreover, the width $L_r$ of the ridge 5 is, for example, equal to about 2 µm and the cuts performed in the waveguide 1 in order to form the periodic structure having four-layer 11–14 unitary cells 15 have a depth $D_c$ of about 1 µm so as to incise also part of the substrate 2 as shown in FIG. 5.

It has been verified that the waveguide 1 having the above values of $D_s$, $D_{c12}$, $D_{co}$, $D_{c11}$, $D_r$ and $n_s$, $n_{c12}$, $n_{co}$, $n_{c11}$, $n_r$ is single-mode both at the wavelength of 775 nm and at the wavelength of 1550 nm.

Thus, it can be used for performing a parametric process in which the wavelengths of the signal and pump radiation are equal to about 1550 and 775 nm (the generated radiation is automatically single-mode).

In general, the values of the refractive indices n1–n4 at the wavelengths (or frequencies) of interest and of the lengths L1–L4 of the device 10 of the invention are selected so as to perform the desired parametric process in phase matching conditions and according to the desired application for the device 10.

For example, the values of the refractive indices n1–n4 and of the lengths L1–L4 can be selected so as to realise a device 10 that performs a difference frequency generation parametric process (typical of a material having non-linearity of the $\chi_2$ type) wherein a pump radiation at frequency $\omega_p$, with $\omega_p=2\omega$, interacts with a signal radiation at frequency $\omega_s$, with $\omega_s=\omega+\Delta\omega$, for generating a radiation at frequency $\omega_g=\omega_p-\omega_s=\omega-\Delta\omega$.

As regards the phase matching condition, in the case of difference frequency generation, it is satisfied when $$\phi_g=\phi_p-\phi_s$$

where $\phi_g$, $\phi_p$ and $\phi_s$ respectively indicate the phase, at the output of the device, of the generated radiation, of the pump radiation and of the signal radiation.

More in particular, if $\omega_p=2\omega$, $\omega_s=\omega+\Delta\omega$ e $\omega_g=\omega-\Delta\omega$, it has been verified that the above phase matching condition is satisfied when $$\phi_{2\omega}=2\phi_\omega$$

where $\phi_{2\omega}$ e $\phi_\omega$ respectively indicate the phase, at the output of the device, of the pump radiation at frequency $2\omega$ and of a radiation at frequency $\omega$.

Moreover, it has been verified that the values of $\phi_{2\omega}$ and $\phi_\omega$ depend on the position of the frequencies $2\omega$ and $\omega$ with respect to the transmission spectrum of the photonic crystal structure 9 of the device 10.

More in particular, it has been verified that in a transmission spectrum of a photonic crystal structure the phase at the transmission peaks increases as the frequencies increase. In particular, if the phase in input to the device is null, in output from the device i) the first transmission peak of the transmission band of first order has a phase of π;
ii) the phase difference between two adjacent transmission peaks in the same transmission band is of π; and
iii) the phase difference between two transmission peaks that respectively are in the proximity of the band edge at low frequency and of the band edge at high frequency of the same band gap is of 2π.

In turn, as regards the type of application, the device 10 that performs the above parametric process according to which $\omega_g=\omega-\Delta\omega$ can, for example, be used as spectral inverter of a signal radiation with respect to a frequency ω

(that is, for generating a frequency ω–Δω from a signal frequency ω$_s$=ω+Δω) or as frequency converter (that is, for converting a signal frequency ω$_s$ into a generated frequency ω$_g$).

In the first case of spectral inverter, it is preferable that the values of the refractive indices n1–n4 and of the lengths L1–L4 are selected so that the device 10 is capable of spectrally inverting signals in a relatively wide range of frequencies (or wavelengths), that is, that the signal radiation frequency ω$_s$ is within a transmission band of the photonic crystal periodic structure 9 (signal tunability).

In turn, in the second case of frequency converter, it is preferable that the values of the refractive indices n1–n4 and of the lengths L1–L4 are selected so that the device 10 is capable of operating with signal radiations and pump radiations in relatively wide intervals of frequencies (or wavelengths), that is, that both the signal radiation frequency ω$_s$ and the pump radiation frequency ω$_p$ are within a transmission band of the photonic crystal periodic structure 9 (pump and signal tunability).

Based on the above conditions i)-iii), to perform a spectral inverter device in the conditions of phase matching and tunability of the frequency ω$_s$ of the signal radiation, the phase φ$_{2ω}$ of the pump radiation at frequency 2ω at the output of the device and the phase φ$_ω$ of the radiation at frequency ω at the output of the device must satisfy the following relations a) φ$_{2ω}$=2φ$_ω$
b) φ$_{2ω}$=(M$_{2ω}$*N±1)*π
c) φ$_ω$=(M$_ω$*N+j)*π where M$_{2ω}$ and M$_ω$ are two integers that respectively indicate the orders of the band gaps of the photonic crystal structure 9 in the proximity of which frequencies 2$_ω$ and ω must be located; N is an integer indicating the number of unitary cells 15 present in the device 10 and j is an integer indicating the j-th transmission peak within a transmission band of the photonic crystal structure 9 and, for what said above, it satisfies the following relation: 1≦j≦N−1.

Condition a) imposes that the phase matching condition is satisfied, condition b) imposes that the pump radiation at frequency 2ω is located at a transmission peak in the proximity of a band edge and condition c) imposes that the radiation at frequency ω is located at a transmission peak within a transmission band.

More in particular, condition b) allows obtaining an efficient parametric process since it has been verified that, in a photonic crystal structure, the efficiency of a parametric process increases when the pump frequency is at a band edge (enhancement phenomenon). In turn, condition c) allows obtaining the tunability of the signal radiation.

Replacing the relations b) and c) in the relation a), we have that the above relations a)–c) are satisfied when $$M_{2\omega} = 2 * M_\omega + 1 \quad (A)$$

$$e \quad j = \frac{N \pm 1}{2} \quad (B)$$

Relation (A) indicates that the order of the band gap in the proximity of frequency 2ω and the order of the band gap in the proximity of frequency o are not independent of each other. In turn, relation (B) shows that frequency ω must be in the middle of a transmission band and that the number N of unitary cells 15 must be an odd number, since j is an integer.

For example, if frequency ω is in the proximity of the first band gap (M$_ω$=1) and the number N of unitary cells 15 is equal to 5, from relations (A) and (B) it results that the frequency 2ω must be in the proximity of the third band gap (M$_{2ω}$=3) and that the frequency co must be at the second or third transmission peak (j=2 or 3) of a transmission band in the proximity of the first band gap.

Replacing these values of M$_ω$, M$_{2ω}$, N and j in relations b) and c) we have that the phase matching condition a) is satisfied when φ$_{2ω}$=14π, or 16π and when φ$_ω$=7π or 8π.

To realise a spectral inverter device in conditions of phase matching and tunability of the frequency ω$_s$ of the signal radiation, the values of n1–n4 and L1–L4 of the device 10 must thus be selected so that the transmission spectrum of the photonic crystal structure of the device 10 satisfies the above relations (A) and (B). Moreover, the number N of unitary cells 15 must be an odd number.

For example, the values of n1–n4 and L1–L4 that allow satisfying relations (A) and (B) can be determined through Maxwell equations of light propagation in a photonic crystal, described for example by Kane S. Yee ("Numerical solution of initial boundary value problems involving Maxwell's equations in isotropic media", IEEE Transactions on Antennas and Propagation, vol. AP-14, no. 3, May, 1996, pages 302–307).

Through simulations with a calculator, the values of L1–L4 for the waveguide 1 described above with reference to FIGS. 4 and 5 have been determined, considering as frequencies 2ω and ω the values corresponding to the wavelengths respectively of 775 nm and 1550 nm, as values of n1 at the wavelengths of interest the values of the effective refractive index of the waveguide 1 at 1550 nm and 775 nm and as values of n2 at the wavelengths of interest, the refractive index of air (which, at 1550 nm and 775 nm is the same).

The following values of L1–L4 resulted from said simulations:

L1=0.404 μm
L2=0.155 μm
L3=0.570 μm
L4=0.108 μm.

That is, the total length (L1+L2+L3+L4) of each unitary cell 15 was of about 1.237 μm.

Moreover, the simulations have shown that a device 10 with the waveguide 1 comprising unitary cells 15 having the above values of n1, n2 and L1–L4 has, in a band of about 80 nm centred around 1550 nm, an efficiency of conversion of about −21 dB for a length of about 299 μm and an efficiency of about −10 dB for a length of some mm, where efficiency of conversion indicates the ratio, expressed in dB, between the power of the generated radiation in output from the device and the power of the signal radiation in input to the device, when the power values are expressed in linear units.

Figure 6:
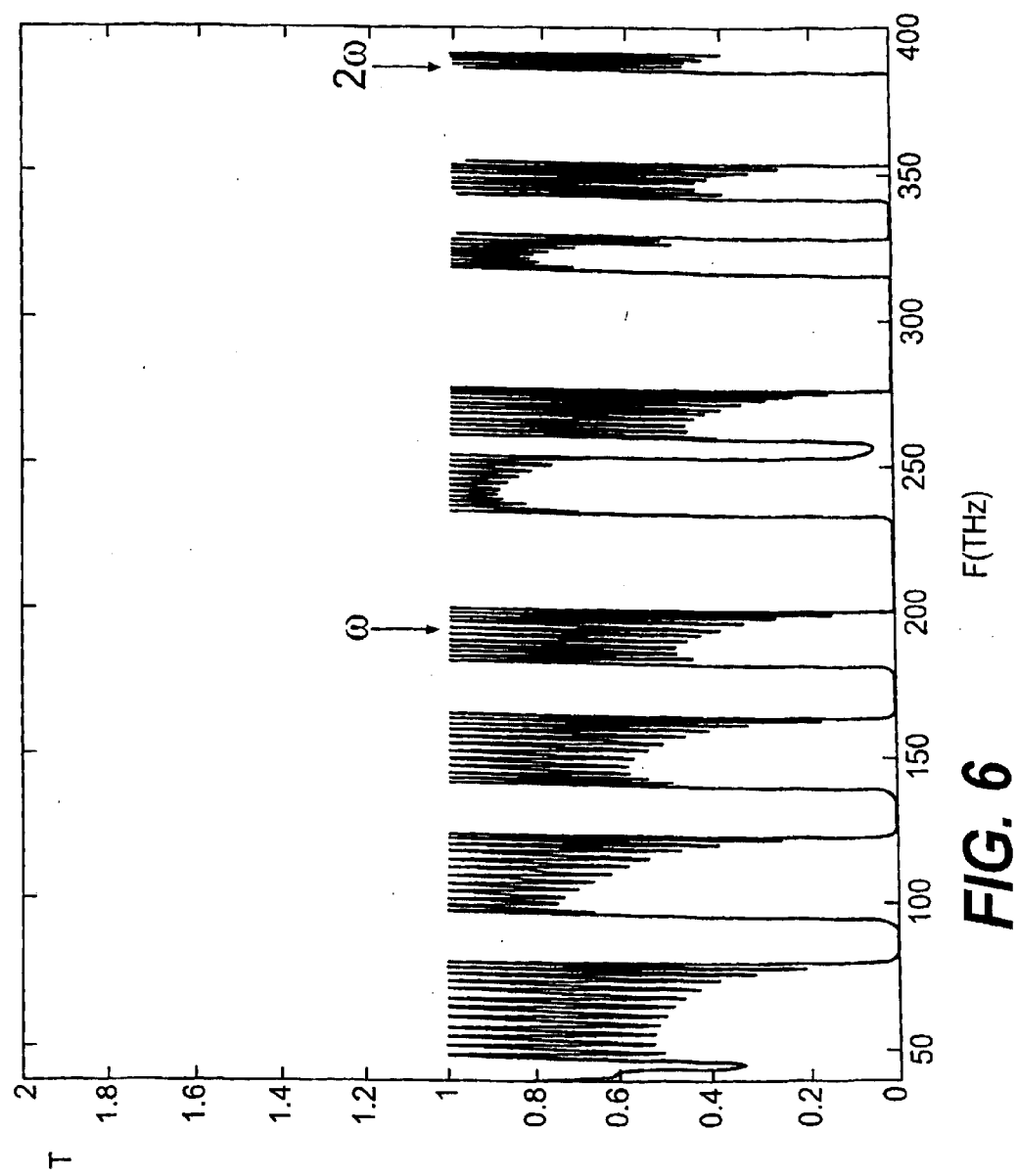
FIG. 6 shows a transmission spectrum in function of the frequency of a first example of a device according to the invention.

With the simulations, moreover, the transmission spectrum T has been determined in function of the frequency f (with f=ω/2π) of the device 10 having the above values of n1, n2, L1–L4, in case of N equal to 13 (FIG. 6).

As it can be noted in said figure, the transmission bands of said spectrum are discontinuous, that is, they consist of transmission peaks (more in particular, in the illustrated case of N=13, each transmission band has twelve transmission peaks). Thus, the device 10 must be designed so that the frequency ω+Δω (ω$_s$) of the signal radiation and the frequency ω−Δω (ω$_g$) of the generated signal radiation are at a transmission peak. More in particular, the number N of unitary cells 15 of the device 10 must be selected so that the spacing in frequency between two transmission peaks of a same transmission band is equal to $\Delta\omega$.

Moreover, as it can be noted from figure FIG. 6, the transmission spectrum satisfies the above mentioned relations (A) and (B). In fact, in such spectrum, the frequency $2\omega$ is in the proximity of the band gap of ninth order ($M_{2\omega}$=9) and the frequency $\omega$ is in the proximity of the band gap of fourth order ($M_{2\omega}$4) and at a transmission peak in the middle of a transmission band. Moreover, the frequency $2\omega$ is at the high frequency edge of the band gap of the ninth order.

Moreover, from the spectrum of FIG. 6 it can be seen that the device 10 has a band centred around 1550 nm for signal radiation. Moreover, it has been verified that said band has a width of about 80 nm. The device 10 can thus be tuned for spectrally inverting signal radiations having wavelengths comprised in an interval of about 80 nm.

By properly selecting the values of n1–n4, L1–L4 and N. the device 10 of the invention is thus capable of realising a spectral inverter in conditions of phase matching and tunability of the frequency $\omega_s$ of the signal radiation.

For example, such spectral inverter can be used for compensating the chromatic dispersion of a signal or of a grid of WDM signals in an optical communication line or system. In this last case, both the spacing in frequency between two adjacent transmission peaks of the device 10 and the spacing in frequency of the grid of WDM signals must be substantially equal to $\Delta\omega$.

Figure 9:
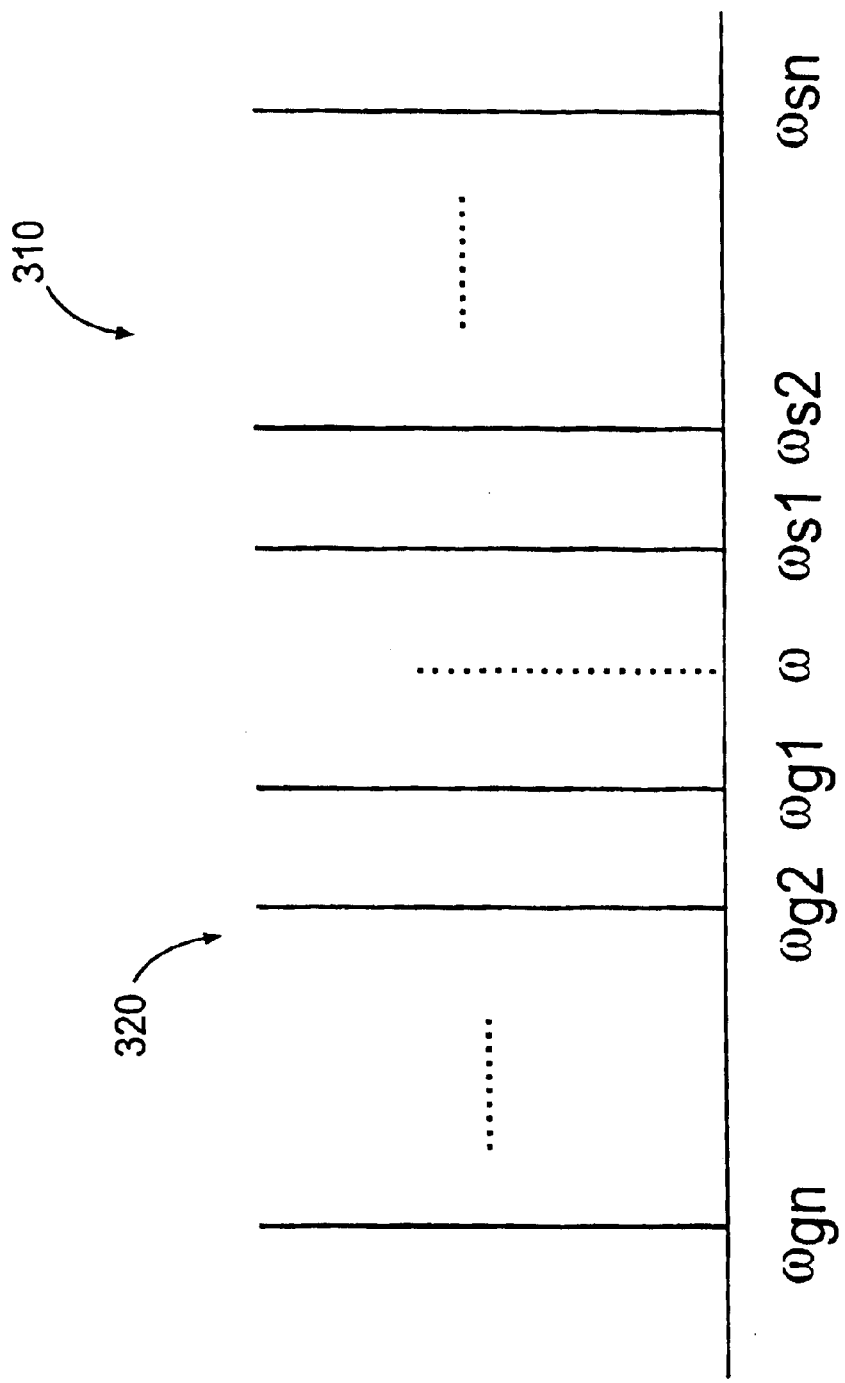
FIG. 9 shows a schematic view of a frequency spectral inversion operation with respect to a frequency $\omega$.

An example of spectral inversion operation of a grid of WDM signals with respect to a frequency $\omega$ is schematically indicated in FIG. 9.

In such figure, reference number 310 indicates the grid of WDM signals to be inverted whereas reference number 320 indicates the generated grid of WDM signals. The WDM signals to be spectrally inverted have frequencies $\omega_{s1}$, $\omega_{s2}$, ... $\omega_{sn}$ respectively equal to $\omega+\Delta\omega$, $\omega+2\Delta\omega$, ... $\omega+n\Delta\omega$ whereas the generated WDM signals have frequencies $\omega_{g1}$, $\omega_{g2}$, ... $\omega_{gn}$ respectively equal to $\omega-\Delta\omega$, $\omega-2\Delta\omega$, ... $\omega-n\Delta\omega$.

It has been verified that in the device 10 designed for performing the spectral inversion operation $\omega_g=\omega_p-\omega_s$, with $\omega p=2\omega$, $\omega_s=\omega+\Delta\omega$ and $\omega_g=\omega-\Delta\omega$ in phase matching conditions, the phase matching condition also occurs for signals at frequencies $\omega+2\Delta\omega$, ... $\omega+n\Delta\omega$.

Moreover, the device 10 designed so as to realise a spectral inverter, can be used for equalising the Raman gain in an optical communication line or system, for example, similarly to what described by A. G. Grandpierre et al. ("*Stimulated Raman scattering cancellation in wavelength-division-multiplexed systems via spectral inversion*", OFC 2000, Tu-A5-1/15–Tu-A5-3/17).

We shall now consider the case of application as frequency converter of the device 10 of the invention that performs the difference frequency generation parametric process where $\omega_p=2\omega$, $\omega_s=\omega+\Delta\omega$ and $\omega_g=\omega-\Delta\omega$.

Considering conditions i)–iii) described above, for realising a frequency converter device in conditions of phase matching and tunability of the frequency $\omega_s$ of the signal radiation and of the frequency $\omega_p$ of the pump radiation, the phase $\phi_{2\omega}$ of the pump radiation at frequency $2\omega$ at the output of the device and the phase $\phi_\omega$ of the radiation at frequency $\omega$ at the output of the device must satisfy the following relations d) $\phi_{2\omega}=2\phi_\omega$
e) $\phi_{2\omega}=(M_{2\omega}*N\pm j_{2\omega})*\pi$
f) $\phi_\omega=(M_\omega*N\pm j_\omega)*\pi$ where $M_{2\omega}$ and $M_\omega$ are two integers that respectively indicate the orders of the band gaps of the photonic crystal structure 9 in the proximity of which frequencies $2\omega$ and $\omega$ must be; N is an integer indicating the number of unitary cells 15 present in the device 10; $j_{2\omega}$ and $j_\omega$ are two integers indicating the j-th transmission peak at which frequencies $2\omega$ (and respectively, $\omega$ must be situated within a transmission band of the photonic crystal structure and, for what said above, they satisfy the following relation: $1 \leq j_{2\omega}, j_\omega \leq N-1$.

Condition d) imposes that the phase matching condition is satisfied, condition e) imposes that the pump radiation at frequency $2\omega$ is at a transmission peak within a transmission band, and condition f) imposes that the radiation at frequency $\omega$ is at a transmission peak within a transmission band.

More in particular, conditions e) and f) allow obtaining the tunability of the signal and pump radiation.

Replacing relations e) and f) in relation d) we have that the above relations d)–f) are satisfied when $M_{2\omega}=2*M_\omega$ (C) e $j_{2\omega}=2*j_\omega$ (D)

Relation (C) indicates that the order of the band gap in the proximity of frequency $2\omega$ and the order of the band gap in the proximity of frequency $\omega$ are not independent of each other. In turn, relation (D) shows that, in order to obtain a good tunability of the pump and signal radiation, frequency $2\omega$ must preferably be situated in a transmission peak that is substantially in the middle of a transmission band, whereas frequency $\omega$ must preferably be situated in a transmission peak that is substantially at a fourth of a transmission band.

For example, if the number N of unitary cells 15 is equal to 20 and frequency $\omega$ is in the proximity of the first band gap ($M_\omega$=1) and at the fifth transmission peak ($j_\omega$=5), from relations (C) and (D) it results that frequency $2\omega$ must be in the proximity of the second band gap ($M_{2\omega}$=2) and at the tenth transmission peak ($j_{2\omega}$=10) of a transmission band in the proximity of the second band gap.

Replacing these values of $M_\omega, M_{2\omega}, N, j_{2\omega}$ e $j_\omega$ in relations e) and f) we note that the phase matching condition d) is satisfied when $\phi_{2\omega}=30\pi$ or $50\pi$ and when $\phi_\omega=15\pi$ or $25\pi$.

For the device 10 to realise a frequency conversion in conditions of phase matching and tunability of the signal frequency $\omega_s$ and of the pump frequency $\omega_p$, the values of n1–n4 and L1–L4 of the device 10 must thus be selected so that the transmission spectrum of the photonic crystal structure 9 satisfies the above relations (C) and (D).

For example, the values of n1–n4 and L1–L4 that allow satisfying relations (C) and (D) can be determined through Maxwell equations of light propagation in a photonic crystal.

Through simulations with a calculator, the values of L1–L4 for the waveguide 1 described above with reference to FIGS. 4 and 5 have been determined, considering as frequencies $2\omega$ and $\omega$ the values corresponding to the wavelengths respectively of 775 nm and 1550 nm, as values of n1 at the wavelengths of interest the values of the effective refractive index of the waveguide 1 at 1550 nm and 775 nm and as values of n2 at the wavelengths of interest, the refractive index of air (which, at 1550 nm and 775 nm is the same).

The following values of L1–L4 resulted from said simulations:

L1=0.315 μm
L2=0.100 μm
L3=0.121 μm
L4=0.100 μm.

That is, the total length (L1+L2+L3+L4) of each unitary cell 15 was of about 0.6365 μm.

Moreover, the simulations have shown that a device 10 comprising unitary cells 15 having the above values of n1, n2 and L1–L4 has, in a band of about 100 nm centred around 1550 nm, an efficiency of conversion of about −40 dB for a length of about 273 μm, an efficiency of about −18 dB for a length of about 3 mm and an efficiency of about −6 dB for a length of about 1 cm.

The efficiency of this device 10 is less than that of the previously described device because in this type of applications, wherein it is required that both the signal radiation and the pump radiation are tunable (that is, they must be situated within a transmission band), the enhancement phenomenon that occurs in a photonic crystal structure when the pump and/or signal radiation are situated at a band edge, is not exploited.

Through the simulations it was obtained the transmission spectrum T, in function of wavelength λ (FIG. 7a) and of frequency F (FIG. 7b), of the waveguide 1 having the above values of n1, n2, L1–L4 in the case of N equal to 13.

Figure 7A:
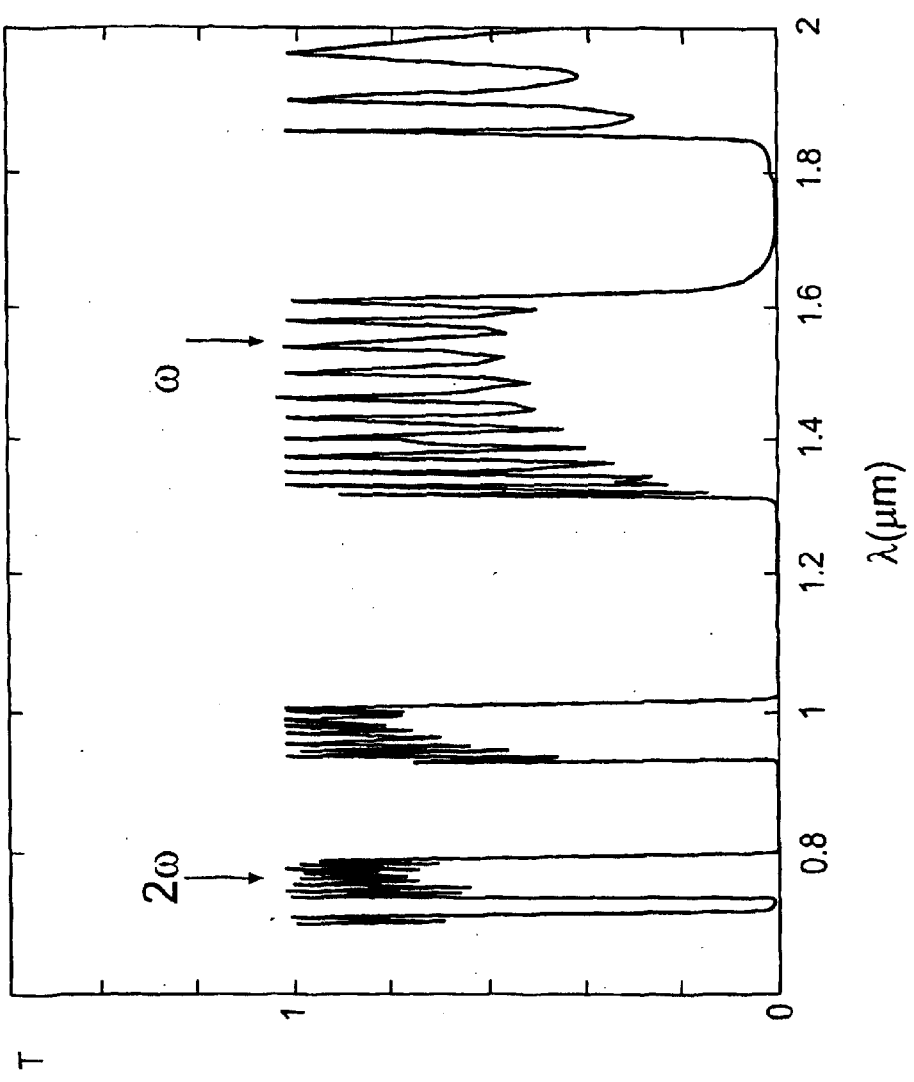
FIG. 7 shows a transmission spectrum of a second example of a device according to the invention in function of the wavelength (FIG. 7a) and of the frequency (FIG. 7b)
Figure 7B:
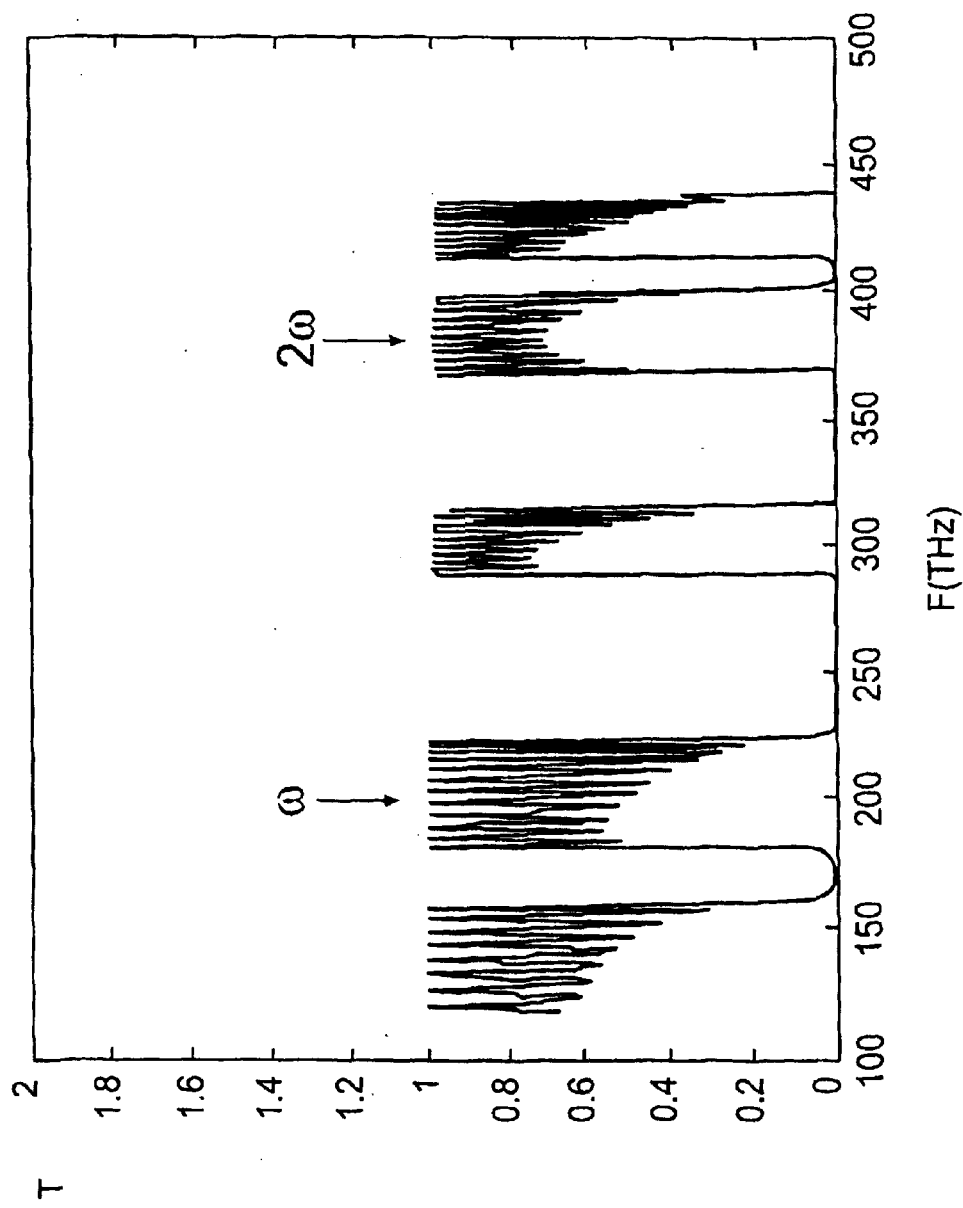

As it can be noted in FIGS. 7a and 7b, the transmission bands of such spectrum are discontinuous, that is, they consist of a plurality of transmission peaks (more in particular, in the illustrated case they consist of 12 transmission peaks). Thus, the device 10 must be designed so that the frequency ω+Δω ($\omega_s$) of the signal radiation and the frequency ω−Δω ($\omega_g$) of the generated signal radiation are situated at a transmission peak. More in particular, the number N of unitary cells 15 of the device 10 must be selected so that the spacing in frequency between two transmission peaks of a same transmission band is equal to Δω.

Moreover, it has been verified that the transmission spectrum of FIG. 7b satisfies the above relations (C) and (D).

Moreover, from the spectrum of FIG. 7a it can be noted that the device 10 has a band centred around 1550 nm for the signal radiation (for which a width of about 100 nm has been determined) and a band centred around 750 nm for the pump radiation (for which a width of about 20 nm has been determined). The device 10 can thus be tuned for converting signal radiations having wavelengths comprised in an interval of about 100 nm around 1550 nm using pump radiations having wavelengths comprised in an interval of about 20 nm around 775 nm.

By properly selecting the values of n1–n4, L1–L4 and N, the device 10 of the invention is thus capable of performing a frequency converter in conditions of phase matching and tunability of the frequency $\omega_s$ of the signal radiation and of the frequency $\omega_p$ of the pump radiation.

For example, such frequency converter can be used for avoiding a conflict of wavelengths in a node of a WDM optical network wherein signals at different wavelengths are routed towards other nodes of the network (S. J. B. Yoo, "*Wavelength conversion technologies for WDM network applications*", Journal of Lightwave Technology, Vol. 14, No. 6, June 1996, pages 955–966).

In fact, in such node it may occur that two signals having the same wavelength (or frequency) must be routed towards the same output, which would imply the need of a device suitable to convert the wavelength of one of the two signals into another wavelength before routing the two signals towards the same node output.

From the examples above it is evident that the device 10 of the invention allows performing a parametric process in phase matching conditions and according to the application required for the device.

Resuming the general description of the device 10, it typically comprises also a pump source (not shown) suitable to provide a pump radiation at frequency $\omega_p$ to the photonic crystal structure 9.

Typically, said pump source is a conventional laser source.

In the preferred embodiment in which the periodic structure 9 is realised in waveguide, the pump source and the waveguide 1 of the device 10 are advantageously integrated in the same substrate (for example, of GaAs).

For realising in the same substrate the laser source with emission at the frequency $\omega_p$ and the waveguide 1, that is transparent at frequency $\omega_p$, it is possible to use the SEA (Selective Area Epitaxy) method—described by J. Coleman ("*Metalorganic chemical vapor deposition for optoelectronic devices*", Proc. of IEEE, vol. 85, No. 11, November 1997, page 1715–1729, —or the known ionic implant method.

The laser source realised in the substrate advantageously is of the DFB type—described, for example, by N. A. Morris et al. ("Single mode distributed-feedback 761 nm GaAs—AlGaAs quantum-well laser", IEE, PTL, 1995)—or of the DBR type with an active region comprised between two Bragg gratings.

If the device 10 has been designed for performing a frequency conversion in tunability conditions of the frequency $\omega_p$ of the pump radiation, the pump source is advantageously tunable in wavelength (or frequency).

Examples of tunable pump sources are, for example, described by N. A. Morris et al. ("*Single-mode distributed-feedback 761-nm GaAs-AlGaAs quantum-well laser*", IEEE Photonics Technology Letters, Vol. 7, No. 5, May 1995, pages 455–457), by K. Kobayashi et al. ("*Single frequency and tunable laser diodes*", Journal of Lightwave Technology, Vol. 6, No. 11, November 1988, pages 1623–1633) and by G. Sarlet et al. ("*Control of widely tunable SSG-DBR lasers for dense wavelength division multiplexing*", Journal of Lightwave Technology, Vol. 18, No. 8, August 2000, pages 1128–1138).

Moreover, the device 10 advantageously comprises also an optical filter (not shown) suitable to let the generated radiation at frequency $\omega_g$ exit from the device 10 and to suppress the residual pump and optionally, residual signal, radiations.

Moreover, the device 10 advantageously has two portions of optical fibre (fibre pigtails) connected to its input and to its output for facilitating its connection to other optical fibre devices.

Figure 10:
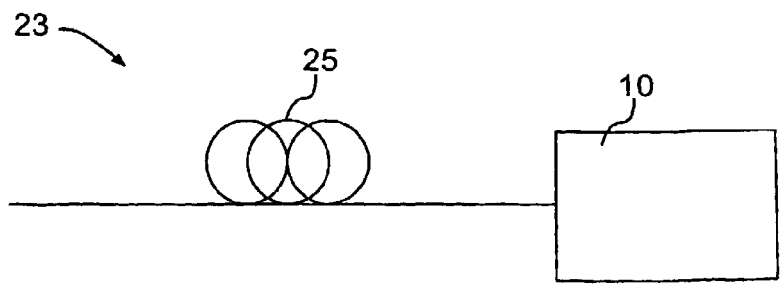
FIG. 10 shows a schematic view of an optical communication line according to the invention.

FIG. 10 shows an optical communication line 23 according to the invention, comprising an optical transmission fibre length 25 and a device 10 according to the invention.

The optical transmission fibre length 25 is a portion of optical fibre conventionally used for optical communications. Typically, it is a portion of single-mode optical fibre at the wavelengths of interest.

The optical transmission fibre length 25 can be used both in a long distance transmission system and in distribution networks such as, for example, access networks.

According to the applications, the optical communication line 23 also comprises an optical amplifier (not shown).

For example, the optical amplifier is of the conventional type and it comprises a portion of erbium-doped active optical fibre and a pump source (for example, a laser source) for pumping the active optical fibre at a pumping wavelength $\lambda_p$.

Typical example of values of wavelength $\lambda_p$ of the pumping signal, in the case of erbium-doped active optical fibre, are equal to about 980 and 1480 nm.

Moreover, the optical amplifier can optionally comprise more than one optical amplification stages.

According to an embodiment not shown, the optical communication line 23 of the invention comprises a plurality of optical transmission fibre lengths 25, a plurality of optical amplifiers interposed between a length and the other of optical transmission fibre 25 and at least one spectral inverter 10 according to the invention, designed for example for compensating at least partly the chromatic dispersion of the plurality of optical transmission fibre lengths 25.

In general, the device 10 of the invention can be arranged at the beginning, at the end or within the optical communication line 23. For example, in the case of application as spectral inverter, it can be inserted in the middle of the optical transmission fibre length 25 as described by M. H. Chou ("*Efficient wide-band and tunable midspan spectral inverter using cascaded nonlinearities in LiNbO₃ waveguides*", IEEE Photonics Technology Letters, Vol. 12, No. 1, January 2000, pages 82–84).

Figure 11:
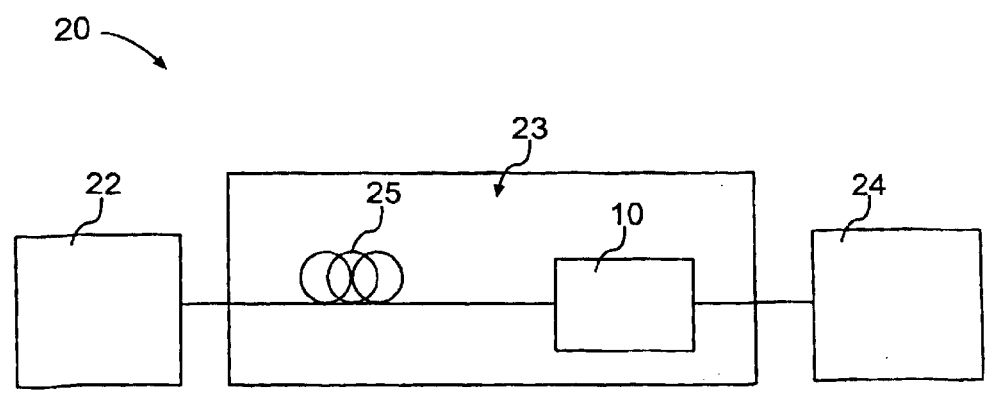
FIG. 11 shows a schematic view of an optical communication system according to the invention.

FIG. 11 shows an optical communication system 20 according to the invention, comprising a transmitting station 22 for providing an optical signal at a wavelength of signal $\lambda$ (corresponding to as frequency $\omega_s$), a receiving station 24 for receiving an optical signal, and an optical communication line 23 for transmitting the optical signal.

According to a preferred embodiment, the optical communication system 20 is a WDM system.

In this case, the transmitting station 22 is a conventional WDM equipment suitable to provide N optical signals having wavelengths $\lambda 1, \lambda 2 \ldots \lambda N$ differing from one another (corresponding to frequencies ($\omega_{s1}, \omega_{s2} \ldots \omega_{sN}$), to wavelength multiplex them and send them in the optical communication line 23.

Moreover, the transmitting station 22 also comprises an optical power amplifier (not shown) (booster) for amplifying the WDM optical signal before sending it along the line 23 (or to a certain number of optical power amplifiers in parallel for amplifying optical signals comprised in different wavelength bands).

Such wavelengths $\lambda 1, \lambda 2 \ldots \lambda N$ are typically selected into a range of wavelengths comprised between about 1500 nm and 1600 nm.

Said receiving station 24 comprises a conventional equipment suitable to demultiplex a WDM optical signal at its input and to send the demultiplexed optical signals to optional further processing stages. Moreover, said receiving station 24 typically comprises also an optical pre-amplifier (not shown) suitable to bring the WDM optical signal at a suitable power level to be received by the receiving equipment (or a certain number of optical pre-amplifiers in parallel for amplifying the optical signals comprised in different wavelength bands).

According to the applications, the line 23 comprises a plurality of conventional optical amplifiers (not shown) for amplifying a signal coming from an upstream portion of the line, in which the signal has attenuated during its propagation along it, and sending it in a downstream portion of the line.

Alternatively, in place of each optical amplifier, the line 23 can comprise a number of optical amplifiers arranged in parallel for amplifying the optical signals comprised in different wavelength bands.

For example, system 20 can be a submarine optical communication system in which line 23 comprises a plurality of spans (not shown) that respectively connect the transmitting station 22 to the first optical amplifier, said amplifier to the next one, and the last amplifier to the receiving station 24.

Each span comprises, for example, a cable in optical transmission fibre 25 and a device 10 according to the invention.

Alternatively, each span comprises a cable in optical transmission fibre 25 and the device 10 according to the invention is inserted only in the last span before the receiving station 24 and/or only in some spans, according to the applications.

The device 10 of the invention, having the transmission spectrum of FIG. 6 can, for example, be used for compensating the chromatic dispersion of the optical transmission fibre lengths 25 in a band of wavelengths of about 80 nm centred around 1550 nm.

What is claimed is:

1. Device for performing a parametric process according to which a pump radiation at frequency $\omega_p$ generates a radiation at frequency $\omega_g$ interacting with at least one signal radiation at frequency $\omega_s$ different from $\omega_p$, comprising:

a substantially periodic photonic crystal structure comprising a plurality of unitary cells that follow one other along a predetermined direction, each unitary cell comprising a first layer having a first refractive index n1 and a first length L1, a second layer having a second refractive index n2, with n1 different from n2, and a second length L2;

an input for sending said at least one signal radiation at frequency $\omega_s$ along said substantially periodic structure;

an input for providing said pump radiation at frequency $\omega_p$ to said substantially periodic structure; and an output suitable to extract from the device said generated radiation at frequency $\omega_g$;

characterised in that each unitary cell also comprises a third layer having a third refractive index n3, with n3 different from n2, and a third length L3 and a fourth layer having a fourth refractive index n4, with n4 different from n1 and from n3, and a fourth length L4, the periodical alternance of the first, second, third and fourth layer forming said substantially periodic photonic crystal structure;

at least one among the first, the second, the third and the fourth layers has a non-linearity of the $\chi_2$ or $\chi_3$ type;

at least one of the following conditions is met:

a) n1 is different from n3;

b) n2 is different from n4;

c) L1 is different from L3;

d) L2 is different from L4; and in that n1, n2, n3, n4, L1, L2, L3, L4 are selected so as to perform the parametric process in phase matching conditions.

2. Device according to claim 1, wherein the first and the third layer of the unitary cells consist of the same material.

3. Device according to claim 1, wherein the second and the fourth layer of the unitary cells consist of the same material.

4. Device according to claim 1, wherein the first, the second, the third and the fourth layer of the unitary cells are side by side to one another.

5. Device according to claim 4, wherein the substantially periodic structure is realised in a planar element.

6. Device according to claim 5, wherein the first and the third layer of the unitary cells consist of the same material, and the second and fourth layer of the unitary cells consist of a gaseous element.

7. Device according to claim 6, wherein the planar element consists of a material having refractive index n1 and non-linearity of the $\chi_2$ or $\chi_3$ type and it has cuts having predetermined depths and lengths and suitably spaced from one another so as to form the second and the fourth layer of the unitary cells, consisting of a gaseous element, and the first and third layer of the unitary cells with refractive index n1 and lengths L1 and L3.

8. Device according to claim 5, wherein the planar element is a planar optical waveguide.

9. Device according to claim 8, wherein the waveguide is suitable to guarantee a single-mode propagation at the frequencies of the radiations involved in the parametric process.

10. Device according to claim 1, wherein, in a parametric process in which a pump radiation at frequency $\omega_p=2\omega$ interacts with a signal radiation at frequency $\omega_s$, with $\omega_s=\omega+\Delta\omega$, per for generating a radiation at frequency $\omega_g$, with $\omega_g=\omega_p-\omega_s=\omega-\Delta\omega$, n1, n2, n3, n4, L1, L2, L3, L4 are selected so that the photonic crystal structure has a band gap of order $M_{2\omega}$ in the proximity of the frequency $2\omega$ and a band gap of order $M_\omega$ in the proximity of the frequency $\omega$ so that the following relation is satisfied: $M_{2\omega}=2M_\omega+1$, where $M_{2\omega}$ and $M_\omega$ are two integers; and a transmission band with a $j_\omega$-th transmission peak at the frequency $\omega$ so that the following relation is satisfied: $j_\omega=(N+1)/2$, where j is an integer comprised between 1 and N−1 and N is the number of unitary cells;

the number N of unitary cells is an odd number; and the number N of unitary cells is selected so that the spacing in frequency between adjacent transmission peaks of a transmission band of the substantially periodic photonic crystal structure is substantially equal to $\Delta\omega$.

11. Device according to claim 1, wherein, in a parametric process in which a pump radiation at frequency $\omega_p=2\omega$ interacts with a signal radiation at frequency $\omega_s$, with $\omega_s=\omega+\Delta\omega$, for generating a radiation at frequency $\omega_g$, with $\omega_g=\omega_p-\omega_s=\omega-\Delta\omega$, n1, n2, n3, n4, L1, L2, L3, L4 are selected so that the substantially periodic photonic crystal structure has a band gap of order $M_{2\omega}$ in the proximity of the frequency $2\omega$ and a band gap of order $M_\omega$ in the proximity of the frequency $\omega$ so that the following relation is satisfied: $M_{2\omega}=2M_\omega$, where $M_{2\omega}$ and $M_\omega$ are two integers; and a transmission band with a $j_\omega$-th transmission peak at the frequency $\omega$ and a transmission band with a $j_{2\omega}$-th transmission peak at frequency $2\omega$ so that the following relation is satisfied: $j_{2\omega}=2j_\omega$, where j is an integer comprised between 1 and N−1 and N is the number of unitary cells; and the number N of unitary cells is selected so that the spacing in frequency between adjacent transmission peaks of a transmission band of the substantially periodic photonic crystal structure is substantially equal to $\Delta\omega$.

12. Device according to claim 1, further comprising a pump source suitable to provide a pump radiation at frequency $\omega_p$ to the substantially periodic photonic crystal structure.

13. Device according to claim 12, wherein the pump source is tunable.

14. Device according to claim 8 or 12, wherein the pump source and the waveguide are integrated in a same substrate.

15. Optical communication line comprising an optical transmission fibre length for transmitting at least one signal radiation at frequency $\omega_s$ and a device, connected to said optical fibre length, for performing a parametric process according to which a pump radiation at frequency $\omega_p$, different from $\omega_s$, generates a radiation at frequency $\omega_g$ interacting with said at least one signal radiation at frequency $\omega_s$, said device comprising:

a substantially periodic photonic crystal structure comprising a plurality of unitary cells that follow one other along a predetermined direction, each unitary cell comprising a first layer having a first refractive index n1 and a first length L1, a second layer having a second refractive index n2, with n1 different from n2, and a second length L2;

an input for sending said at least one signal radiation at frequency $\omega_s$ along said substantially periodic structure;

an input for providing said pump radiation at frequency $\omega_p$ to said substantially periodic structure; and an output suitable to extract from the device said generated radiation at frequency $\omega_g$;

characterised in that each unitary cell also comprises a third layer having a third refractive index n3, with n3 different from n2, and a third length L3 and a fourth layer having a fourth refractive index n4, with n4 different from n1 and from n3, and a fourth length L4, the periodical alternance of the first, second, third and fourth layer forming said substantially periodic photonic crystal structure;

at least one among the first, the second, the third and the fourth layers has a non-linearity of the $\chi_2$ or $\chi_3$ type;

at least one of the following conditions is met:

a) n1 is different from n3;

b) n2 is different from n4;

c) L1 is different from L3;

d) L2 is different from L4; and n1, n2, n3, n4, L1, L2, L3, L4 have such values as to perform the parametric process in phase matching conditions.

16. Optical communication system according to claim 15, wherein said transmitting station is suitable to provide n optical signals having frequencies $\omega_{s1}, \omega_{s2} \ldots \omega_{sn}$, differing from one another, to wavelength multiplex them in a single WDM optical signal and to send said optical signal along the optical communication line.

17. Optical communication system comprising a transmitting station for providing at least one signal radiation at frequency $\omega_s$;

an optical communication line, connected to said transmitting station, for transmitting said signal radiation;

a receiving station connected to said optical communication line; and a device for performing a parametric process according to which a pump radiation at frequency $\omega_p$, different from $\omega_s$, generates a radiation at frequency $\omega_g$ interacting with said at least one signal radiation at frequency $\omega_s$, said device comprising a substantially periodic photonic crystal structure comprising a plurality of unitary cells that follow one other along a predetermined direction, each unitary cell comprising a first layer having a first refractive index n1 and a first length L1, a second layer having a second refractive index n2, with n1 different from n2, and a second length L2, an input for receiving said at least one signal radiation at frequency $\omega_s$ and send it along said substantially periodic structure;

an input for providing said pump radiation at frequency $\omega_p$ to said substantially periodic structure;

an output suitable to extract from the device said radiation generated at frequency $\omega_g$;

characterised in that each unitary cell also comprises a third layer having a third refractive index n3, with n3 different from n2, and a third length L3 and a fourth layer having a fourth refractive index n4, with n4 different from n1 and from n3, and a fourth length L4, the periodical alternance of the first, second, third and fourth layer forming said substantially periodic photonic crystal structure;

at least one among the first, the second, the third and the fourth layers has a non-linearity of the $\chi_2$ or $\chi_3$ type;

at least one of the following conditions is met:
 a) n1 is different from n3;
 b) n2 is different from n4;
 c) L1 is different from L3;
 d) L2 is different from L4; and n1, n2, n3, n4, L1, L2, L3, L4 have such values as to perform the parametric process in phase matching conditions.

18. A substantially periodic photonic crystal structure comprising a plurality of unitary cells that follow one other along a predetermined direction, each unitary cell comprising:

a first layer having a first refractive index n1 and a first length L1;

second layer having a second refractive index n2, with n1 different from n2, and a second length L2;

a third layer having a third refractive index n3, with n3 substantially equal to n1, and a third length L3 and a fourth layer having a fourth refractive index n4, with n4 substantially equal to n2, and a fourth length L4, the periodical alternance of the first, second, third and fourth layer forming said substantially periodic photonic crystal structure;

wherein at least one among the first, the second, the third and the fourth layers has a non-linearity of the $\chi_2$ or $\chi_3$ type, the first, second, third and fourth layers are side-by-side one another in a planar element, the first and the third layer consist of the same material, and the second and the fourth layer consist of a gaseous element; and wherein at least one of the following conditions is met:
 a) L1 is different from L3;
 b) L2 is different from L4.

19. A substantially periodic photonic crystal structure according to claim 18, wherein the difference between the refractive indices n1, n3 and n2, n4 is equal to at least 0.2.

20. A substantially periodic photonic crystal structure according to claim 18, wherein the difference between the refractive indices n1, n3 and n2, n4 is equal to at least 0.4.

21. Method for generating, through a parametric process, a radiation at frequency $\omega_g$ through the interaction of a pump radiation at frequency $\omega_p$ with at least one signal radiation at frequency $\omega_s$, different from $\omega_p$, comprising the steps of:

a) supplying the radiations at frequencies $\omega_s$ and $\omega_p$ in a substantially periodic photonic crystal structure comprising a plurality of unitary cells that follow one other along a predetermined direction, each unitary cell comprising a first layer having a first refractive index n1 and a first length L1, a second layer having a second refractive index n2, with n1 different from n2, and a second length L2, and b) supplying the radiation at frequency $\omega_g$, generated in said structure, to an output;

characterised in that each unitary cell also comprises a third layer having a third refractive index n3, with n3 different from n2, and a third length L3 and a fourth layer having a fourth refractive index n4, with n4 different from n1 and from n3, and a fourth length L4, the periodical alternance of the first, second, third and fourth layer forming said substantially periodic photonic crystal structure;

at least one among the first, the second, the third and the fourth layers has a non-linearity of the $\chi_2$ or $\chi_3$ type;

at least one of the following conditions is met:
 a) n1 is different from n3;
 b) n2 is different from n4;
 c) L1 is different from L3;
 d) L2 is different from L4; and in that n1, n2, n3, n4, L1, L2, L3, L4 have such values as to perform the parametric process in phase matching conditions.

22. A substantially periodic photonic crystal structure comprising a plurality of unitary cells that follow one other along a predetermined direction, each unitary cell comprising a first layer having a first refractive index n1 and a first length L1, a second layer having a second refractive index n2, with n1 different from n2, and a second length L2, a third layer having a third refractive index n3, with n3 different from n2, and a third length L3 and a fourth layer having a fourth refractive index n4, with n4 different from n1 and from n3, and a fourth length L4, the periodical alternance of the first, second, third and fourth layer forming said substantially periodic photonic crystal structure;

wherein at least one among the first, the second, the third and the fourth layers has a non-linearity of the $\chi_2$ or $\chi_3$ type;

the first, second, third and fourth layer are side by side to one other in a planar element;

the first and the third layer consist of the same material;

the second and the fourth layer consist of a gaseous element, and wherein at least one of the following conditions is met:
 a) n2 is different from n4;
 b) L1 is different from L3;
 c) L2 is different from L4.

* * * * *